United States Patent
Niibe et al.

(10) Patent No.: US 12,103,987 B2
(45) Date of Patent: Oct. 1, 2024

(54) METHOD FOR PRODUCING CATALYST COMPONENT FOR OLEFIN POLYMERIZATION, METHOD FOR PRODUCING CATALYST FOR OLEFIN POLYMERIZATION, AND METHOD FOR PRODUCING OLEFIN POLYMER

(71) Applicant: JAPAN POLYPROPYLENE CORPORATION, Tokyo (JP)

(72) Inventors: Morikazu Niibe, Mie (JP); Miyuki Murase, Tokyo (JP); Takehiro Sagae, Mie (JP)

(73) Assignee: JAPAN POLYPROPYLENE CORPORATION, Tokyo (JP)

( * ) Notice: Subject to any disclaimer, the term of this patent is extended or adjusted under 35 U.S.C. 154(b) by 584 days.

(21) Appl. No.: 17/598,692

(22) PCT Filed: Mar. 17, 2020

(86) PCT No.: PCT/JP2020/011844
§ 371 (c)(1),
(2) Date: Sep. 27, 2021

(87) PCT Pub. No.: WO2020/203274
PCT Pub. Date: Oct. 8, 2020

(65) Prior Publication Data
US 2022/0144978 A1   May 12, 2022

(30) Foreign Application Priority Data

Mar. 29, 2019 (JP) ................................. 2019-067540

(51) Int. Cl.
*C08F 10/06* (2006.01)
(52) U.S. Cl.
CPC .......... *C08F 10/06* (2013.01); *C08F 2410/06* (2021.01); *C08F 2420/00* (2013.01)

(58) Field of Classification Search
CPC ... C08F 10/06; C08F 2410/06; C08F 2420/00
See application file for complete search history.

(56) References Cited

U.S. PATENT DOCUMENTS

| 4,386,016 A | 5/1983 | Scholten et al. |
| 5,308,811 A | 5/1994 | Suga et al. |

(Continued)

FOREIGN PATENT DOCUMENTS

| CN | 1325909 A | 12/2001 |
| CN | 1394209 A | 1/2003 |

(Continued)

OTHER PUBLICATIONS

International Search Report issued in International Bureau of WIPO Patent Application No. PCT/JP2020/011844, dated Jun. 9, 2020.

(Continued)

*Primary Examiner* — Catherine S Branch
(74) *Attorney, Agent, or Firm* — GREENBLUM & BERNSTEIN P.L.C.

(57) ABSTRACT

The present invention relates to a method for producing a catalyst component for olefin polymerization, the method including step (3): granulating, by a spray drying, an aqueous slurry of an ion-exchangeable second layered silicate (B) that satisfies that an average particle diameter is 0.03 μm to 0.4 μm, and a Rosin-Rammler distribution constant n determined from a particle size distribution is 1.5 or more; and step (4): bringing the obtained first layered silicate granulated particles (C) into contact with acid to obtain chemically treated ion-exchangeable second layered silicate granulated particles (D).

12 Claims, 3 Drawing Sheets

(56) References Cited

U.S. PATENT DOCUMENTS

| | | |
|---|---|---|
| 5,928,982 A | 7/1999 | Suga et al. |
| 5,973,084 A | 10/1999 | Suga et al. |
| 2002/0004447 A1 | 1/2002 | Nakano et al. |
| 2003/0027950 A1 | 2/2003 | Uchino et al. |
| 2016/0272736 A1 | 9/2016 | Murase et al. |

FOREIGN PATENT DOCUMENTS

| | | |
|---|---|---|
| CN | 105683221 A | 6/2016 |
| EP | 0 050 902 | 5/1982 |
| EP | 1-0881232 | 12/1998 |
| EP | 0881232 A1 | 12/1998 |
| JP | S57-100913 A | 6/1982 |
| JP | 5-301917 | 11/1993 |
| JP | 7-309907 | 11/1995 |
| JP | 8-127613 | 5/1996 |
| JP | 10-168109 | 6/1998 |
| JP | 10-324708 | 12/1998 |
| JP | 2000-264912 | 9/2000 |
| JP | 2007-145914 A | 6/2007 |
| JP | 2008-162857 | 7/2008 |
| JP | 2012-126084 | 7/2012 |
| JP | 2012-206910 | 10/2012 |
| JP | 2012-214745 | 11/2012 |
| JP | 2016-204525 | 12/2016 |
| JP | 2017-171801 | 9/2017 |

OTHER PUBLICATIONS

Written Opinion issued in International Bureau of WIPO Patent Application No. PCT/JP2020/011844, dated Jun. 9, 2020.
Office Action issued in JP Patent Application No., 2020-046765, Feb. 6, 2024, translation.
Office Action issued in Chinese Patent Application No. 202080024659.4, Oct. 12, 2022, translation.
European Search Report issued with respect to European Application No. 20785085.0, dated Apr. 28, 2022.

METHOD FOR PRODUCING CATALYST COMPONENT FOR OLEFIN POLYMERIZATION, METHOD FOR PRODUCING CATALYST FOR OLEFIN POLYMERIZATION, AND METHOD FOR PRODUCING OLEFIN POLYMER

TECHNICAL FIELD

The present invention relates to a method for producing a catalyst component for olefin polymerization, a method for producing a catalyst for olefin polymerization, and a method for producing an olefin polymer. More specifically, the invention relates to a method for producing a catalyst component for olefin polymerization, a method for producing a catalyst for olefin polymerization, and a method for producing an olefin polymer, each of which includes an ion-exchangeable layered silicate having a specific structure, has high activity per solid component, and can give a polymer having a high molecular weight.

BACKGROUND ART

There has been known a catalyst for olefin polymerization using a clay, a clay mineral, or a layered silicate compound as a catalyst component (for example, see Patent Literature 1). In the technical field of a catalyst for olefin polymerization containing, as a catalyst component, a clay, a clay mineral, or an ion-exchangeable layered compound, various solutions for improving catalytic activity as a problem have been proposed (see, for example, Patent Literatures 2 to 4). For example, there has been known a catalyst for olefin polymerization containing, as a catalyst component, a clay, a clay mineral, or an ion-exchangeable layered compound, which has been subjected to an acid treatment, a salt treatment, or a chemical treatment in the presence of acid and a salt.

A technique for improving the catalytic activity by using a ground clay mineral or ion-exchangeable layered compound is disclosed (see Patent Literature 5).

Further, as a technique focusing on a specific structure of an ion-exchangeable layered silicate, a technique in which an amount of micropores of the ion-exchangeable layered silicate is defined and a technique in which a desorption rate of a metal atom which is desorbed when the ion-exchangeable layered silicate is chemically treated with inorganic acid is defined are disclosed (see Patent Literatures 6 and 7).

These are techniques for increasing a treating surface by controlling a function of swelling as one of characteristics at a chemical treatment of the ion-exchangeable layered silicate, to obtain a highly active ion-exchangeable layered silicate having a large amount of micropores with a small pore diameter.

In addition, techniques related to a catalyst component for olefin polymerization are also disclosed (Patent Literatures 8 to 10).

CITATION LIST

Patent Literature

Patent Literature 1: JP-A-H5-301917
Patent Literature 2: JP-A-H7-309907
Patent Literature 3: JP-A-H8-127613
Patent Literature 4: JP-A-H10-168109
Patent Literature 5: JP-A-2000-264912
Patent Literature 6: JP-A-2012-214745
Patent Literature 7: JP-A-2012-206910
Patent Literature 8: JP-A-H10-324708
Patent Literature 9: JP-A-2012-126084
Patent Literature 10: JP-A-2008-162857

SUMMARY OF INVENTION

Technical Problem

However, the techniques of related art as described above do not provide catalytic activity that can withstand practical use, and are still insufficient in order to improve polymerization activity and to give a polymer having a higher molecular weight, so that further improvement of the technique is desired.

An object of the present invention is to provide a method for producing a catalyst component for olefin polymerization, a method for producing a catalyst for olefin polymerization, and a method for producing an olefin polymer, which has a high activity and can give a polymer having a higher molecular weight, in view of the above-described circumstances and problems of the related art.

Solution to Problem

As a result of intensive studies to solve the above problems, the present inventors have found that catalytic activity is significantly improved by using a catalyst component for olefin polymerization obtained by a production method including a step of obtaining a chemically treated ion-exchangeable layered silicate in which an ion-exchangeable layered silicate having a specific structure is subjected to an appropriate chemical treatment. More specifically, the present inventors have found that, when using a catalyst component for olefin polymerization obtained by a production method including a step of obtaining a chemically treated ion-exchangeable layered silicate granulated particles in which basic particles of an aqueous slurry of an ion-exchangeable layered silicate have a specific average particle diameter and particle size distribution and are chemically treated by contact with acid, catalytic activity is significantly improved and a polymer having a high molecular weight is obtained, and have completed the present invention.

The present invention can be implemented in the following embodiments.

[1] A method for producing a catalyst component for olefin polymerization, including the following step (3) and the following step (4):

step (3): granulating, by a spray drying, an aqueous slurry of an ion-exchangeable second layered silicate (B) that satisfies the following characteristic (b1) and characteristic (b2) to obtain ion-exchangeable first layered silicate granulated particles (C), characteristic (b1): an average particle diameter is 0.03 µm to 0.4 µm, characteristic (b2): a Rosin-Rammler distribution constant n as determined from a particle size distribution is 1.5 or more, and step (4): bringing the obtained first layered silicate granulated particles (C) into contact with acid to obtain chemically treated ion-exchangeable second layered silicate granulated particles (D).

[2] The method for producing a catalyst component for olefin polymerization according to [1], wherein the second layered silicate (B) contains smectite.

[3] The method for producing a catalyst component for olefin polymerization according to [1] or [2], wherein the second layered silicate (B) contains montmorillonite.

[4] The method for producing a catalyst component for olefin polymerization according to any one of [1] to [3], wherein the second layered silicate granulated particles (D) have a specific surface area of 350 m²/g or more.

[5] The method for producing a catalyst component for olefin polymerization according to any one of [1] to [4], further including the following step (5):
  step (5): bringing the obtained second layered silicate granulated particles (D) into contact with at least one of a base and a salt to obtain chemically treated ion-exchangeable third layered silicate granulated particles (E).

[6] The method for producing a catalyst component for olefin polymerization according to any one of [1] to [5], further including the following step (2) before the step (3):
  step (2): grinding an ion-exchangeable first layered silicate (A) with a grinder to obtain the second layered silicate (B).

[7] The method for producing a catalyst component for olefin polymerization according to any one of [1] to [5], further including the following step (1) before the step (3):
  step (1): grinding an aqueous slurry of an ion-exchangeable first layered silicate (A) by a wet bead mill to obtain an aqueous slurry of the second layered silicate (B).

[8] The method for producing a catalyst component for olefin polymerization according to any one of [1] to [7], wherein the first layered silicate granulated particles (C) satisfy the following characteristic (c1):
  characteristic (c1): in X-ray diffraction (XRD), a peak (x) is present in a first range of 2θ of 19.0 degrees to 20.0 degrees and a peak (y) is present in a second range of 2θ of 5.0 degrees to 10.0 degrees, and a relationship of 0.27≤(Y/X) is satisfied, where X is a maximum peak intensity in the first range and Y is a maximum peak intensity in the second range.

[9] A method for producing a catalyst for olefin polymerization, including: bringing the following component (I) and component (II) into contact with each other:
  component (I): a catalyst component for olefin polymerization obtained by the production method according to any one of [1] to [8]; and
  component (II): a metallocene compound.

[10] The method for producing a catalyst for olefin polymerization according to [9], further including: bringing the following component (III) into contact with the component (I) and the component (II):
  component (III): an organoaluminum compound.

[11] The method for producing a catalyst for olefin polymerization according to [9] or [10], further including: bringing an α-olefin having 2 to 20 carbon atoms into contact with the component (I) and the component (II).

[12] A method for producing an olefin (co)polymer, including: homopolymerizing or copolymerizing an α-olefin having 2 to 20 carbon atoms in a presence of a catalyst for olefin polymerization obtained by the production method according to any one of [9] to [11].

Advantageous Effects of Invention

According to the method for producing a catalyst component for olefin polymerization of the present invention, it is possible to produce a catalyst component for olefin polymerization, which has a high activity by increasing the number of active sites and can produce an olefin polymer having a higher molecular weight.

According to the method for producing a catalyst for olefin polymerization of the present invention, a catalyst for olefin polymerization having high activity and a high molecular weight can be produced.

In the method for producing an olefin copolymer, an olefin polymer having high activity and a high molecular weight can be produced.

DESCRIPTION OF EMBODIMENTS

Figure 1:
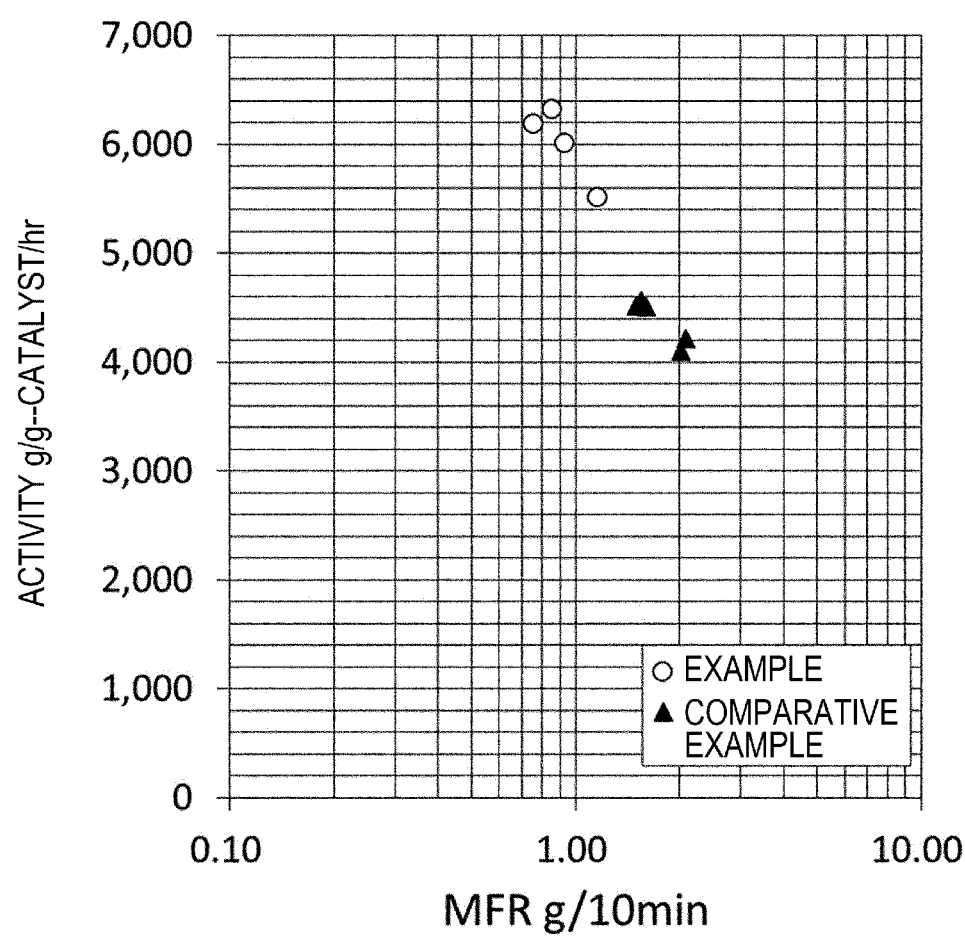
FIG. 1 is a graph showing a relationship between MFR and catalytic activity.

Hereinafter, the present invention will be specially described in detail for each item.
In the present specification, a numerical range using "to" includes a lower limit value and an upper limit value unless otherwise specified.

1. Method for Producing Catalyst Component for Olefin Polymerization

A method for producing a catalyst component for olefin polymerization includes at least the following step (3) and the following step (4):
  step (3): granulating, by a spray drying, an aqueous slurry of an ion-exchangeable second layered silicate (B) that satisfies the following characteristic (b1) and characteristic (b2) to obtain ion-exchangeable first layered silicate granulated particles (C),
    characteristic (b1): an average particle diameter is 0.03 μm to 0.4 μm,
    characteristic (b2): a Rosin-Rammler distribution constant n as determined from a particle size distribution is 1.5 or more, and
  step (4): bringing the obtained first layered silicate granulated particles (C) into contact with acid to obtain chemically treated ion-exchangeable second layered silicate granulated particles (D).

The method for producing a catalyst component for olefin polymerization may further include the following step (1) or step (2) before the step (3) in addition to the step (3) and the step (4):
  step (1): grinding an aqueous slurry of an ion-exchangeable first layered silicate (A) by a wet bead mill to obtain an aqueous slurry of the second layered silicate (B); and
  step (2): grinding an ion-exchangeable first layered silicate (A) with a grinder to obtain the second layered silicate (B).

It is noted that the step (1) is wet grinding, and the step (2) is dry grinding or wet grinding. The second layered silicate (B) constituting the aqueous slurry obtained in the step (1) or the second layered silicate (B) obtained in the step (2) satisfies the characteristic (b1) and (b2) in the step (3).

The method for producing a catalyst component for olefin polymerization may further include the following step (5) after the step (4):
  step (5): bringing the obtained second layered silicate granulated particles (D) into contact with at least one of a base and a salt to obtain chemically treated ion-exchangeable third layered silicate granulated particles (E).

Hereinafter, the first layered silicate (A), the second layered silicate (B), the first layered silicate granulated particles (C), the second layered silicate granulated particles (D), the third layered silicate granulated particles (E), the step (1), the step (2), the step (3), the step (4), and the step (5) will be described in detail.

(1) Ion-exchangeable First Layered Silicate (A) and Ion-exchangeable Second Layered Silicate (B)

The first layered silicate (A) and the second layered silicate (B) used in the method for producing a catalyst component for olefin polymerization according to the present embodiment basically have a structure (tetrahedral sheet) in which silicon and oxygen are planarly connected in a tetrahedral shape and a structure (octahedral sheet) in which aluminum and at least one of oxygen and a hydroxyl group are planarly connected in an octahedral shape. As a unit structure, there are a structure including one tetrahedral sheet and one octahedral sheet (1:1 type) and a structure including two tetrahedral sheets and one octahedral sheet (2:1 type). Further, the 1:1 type and the 2:1 type may not only be single, but the 1:1 type and the 2:1 type may be mixed in any proportion. Both of the 1:1 type and the 2:1 type have a laminated structure in which unit structures are repeated in parallel, and the unit structures may be laminated with exchangeable cations interposed therebetween.

In the tetrahedral sheet, a part of silicon may be substituted with aluminum. In the octahedral sheet, a part of aluminum may be substituted with at least one kind selected from magnesium, iron, and the like. Furthermore, in the octahedral sheet, magnesium instead of aluminum may be planarly connected to at least one of oxygen and a hydroxyl group in an octahedral shape, and a part of magnesium may be substituted with aluminum.

Specific examples of the first layered silicate (A) and the second layered silicate (B) used in the production of the catalyst component for olefin polymerization according to the present embodiment include a layered silicate having a (i) 1:1 type structure and a (ii) 2:1 type structure described in "Clay Mineralogy" (written by Haruo Shiramizu, published by Asakura Publishing Co., Ltd., 1995) and the like.

Specific examples of the first layered silicate (A) and second layered silicate (B), each having the (i) 1:1 type structure as a main constituent layer, include kaolinite-serpentine groups such as kaolinite, dickite, halloysite, chrysotile, lizardite, and amesite.

Specific examples of the first layered silicate (A) and the second layered silicate (B) each having the (ii) 2:1 type structure as a main constituent layer include pyrophyllite talc groups such as pyrophyllite and talc; mica groups such as muscovite, paragonite, ilite, phlogopite, biotite, and lepidrite; brittle mica groups such as margalite, clintonite, and anandite; chlorite groups such as dombassite, cookeite, sudoite, clinochlore, chamocite, and nimite; vermiculite groups such as vermiculite; and smectite groups such as montmorillonite, beidellite, saponite, hectorite, and sauconite.

The first layered silicate (A) and the second layered silicate (B) used in the production of the catalyst component for olefin polymerization according to the present embodiment may be also obtained by forming a mixed layer of the above (i) and (ii). Among them, the ion-exchangeable layered silicate having the 2:1 type structure of (ii) is preferable. The first layered silicate (A) and the second layered silicate (B) more preferably contain smectite, that is, are smectite-group silicates, and still more preferably contain montmorillonite.

The smectite-group silicate used in the present embodiment is a 2:1 type ion-exchangeable layered silicate, the octahedral sheet is a dioctahedron, and is represented by the following formula (1).

$(M^+, M^{2+}_{0.5})_{x+y}(Y^{3+}_{2-y}, Y^{2+}_{y})(Si_{4-x}, Al_x)O_{10}(OH)_2$   formula (1)

$M^+$ is at least one of a Na ion and a K ion, $M^{2+}$ is a Ca ion, $Y^{3+}$ is a trivalent metal ion of any one or more of Al, Fe, Mn, and Cr, and $Y^{2+}$ is a divalent metal ion of any one or more of Mg, Fe, Mn, Ni, and Zn.

Here, in the formula (1), $(M^+, M^{2+}_{0.5})$ represents an interlayer ion, $(Y^{3+}_{2-y}, Y^{2+}_{y})$ represents an octahedral sheet, and $(Si_{4-x}, Al_x)$ represents a tetrahedral sheet, which are described in Clay Handbook 3rd Edition (Clay Science Society of Japan, Gihodo Shuppan Co., Ltd., published on Apr. 30, 2009, page 65).

The 2:1 type ion-exchangeable layered silicate refers to an ion-exchangeable layered silicate in a case where two tetrahedral sheets are combined by sandwiching one octahedral sheet therebetween. The ion-exchangeable layered silicate may be also represented by adding water molecules contained between layers to the formula (1), which is omitted here. An amount of the water molecules contained between layers varies depending on a type of interlayer metal, and further varies constantly due to the influence of an external environment. Therefore, the water molecules are described as "nH$_2$O", and are rarely shown as a qualitative amount, and a range of n is also uncertain. However, it can also be considered that a value of n is in a range in which the ion-exchangeable layered silicate can be handled as a powder, and the value of n is preferably about 20 or 10 at the maximum.

(2) Characteristic (b1) and Characteristic (b2) of Second Layered Silicate (B)

An average particle diameter of the second layered silicate (B) is 0.03 μm or more and 0.4 μm or less (characteristic (b1)), and a Rosin-Rammler distribution constant n as obtained from a particle size distribution of an aqueous slurry of the ion-exchangeable layered silicate is 1.5 or more (characteristic (b2)).

The Rosin-Rammler distribution constant n can be calculated by a Rosin-Rammler equation represented by the following formula (2). The distribution constant n represents a degree of uniformity of the particle size, and it is determined that the larger the numerical value of n is, the more excellent the uniformity of the particle size is.

$$R = 100\exp\{-(D/De)^n\}$$   formula (2)

In the formula, D represents a particle diameter of the second layered silicate (B), R is a mass percentage of particles larger than D (particle diameter) with respect to total particles, and De is the number of particle size characteristics.

The layered silicate that satisfies the characteristic (b1) and characteristic (b2) has not been known at all in related art. The layered silicate which is known in related art and is obtained by a grinder such as a wet bead mill has an average particle diameter outside a range of 0.03 μm or more and 0.4 μm or less, the Rosin-Rammler distribution constant n of less than 1.5, or both.

The present invention is characterized in that the second layered silicate (B) having novel characteristics of the characteristic (b1) and the characteristic (b2) is used. The second layered silicate (B) that satisfies the characteristic (b1) and the characteristic (b2) may be natural, or may be obtained through a purification step such as elutriation or centrifugation, or a grinding step described later. The grinding step can be achieved by, for example, wet grinding using a bead mill called "Mugenflow" manufactured by Ashizawa Finetech Co., Ltd., as described later, but the method for grinding so as to satisfy these characteristics is not particularly limited. In order to satisfy the characteristic (131) and the characteristic (b2), it is needless to say that a device other than "Mugenflow" manufactured by Ashizawa Finetech Co., Ltd. may be used.

The Rosin-Rammler distribution constant n as obtained from the particle size distribution which is defined in the present embodiment is specifically obtained as follows.

When the above formula (2) is modified, the following formula (3) is obtained:

$$\text{Log}\{\log(100/R)\} = n\log D + C \qquad \text{formula (3)}$$

In the formula, C represents a constant (C=log·log e−n log De).

From the above formula (3), when such relationship is plotted on a Rosin-Rammler (RR) diagram with a scale of log D on an x axis and log {log(100/R)} on a y axis, the relationship becomes substantially a straight line. A value of gradient of the straight line is the Rosin-Rammler distribution constant n. The gradient of the straight line is calculated by a least-squares method, and a value thereof is taken as n. In the present embodiment, D is the average particle diameter, and the value n of the gradient of the straight line corresponds to the characteristic (b2).

The average particle diameter in the present embodiment refers to a median diameter measured by the following method after the second layered silicate (B) is dispersed in water. First, 0.05 g of the second layered silicate (B) is weighed, and slowly added to 9.95 g of distilled water while stirring with a stirrer to prepare uniform aqueous slurry of 0.5% by weight of the second layered silicate (B). The aqueous slurry is allowed to stand at a liquid temperature of 20° C. to 60° C. for 12 hours or more, then subjected an ultrasonic treatment for 10 minutes, and the aqueous slurry of the second layered silicate (B) is used as a sample and measured using a laser diffraction and scattering particle size measuring device (for example, a laser diffraction and scattering particle size distribution measuring device LA-920, LA-960V2, manufactured by Horiba, Ltd.) or a dynamic light scattering particle size measuring device (for example, a dynamic light scattering particle size distribution measuring device Nanotrac Wave II series, manufactured by MicrotracBEL Corporation). The detailed measurement conditions are described in Examples. Also, in the particle size distribution, data of D and R can be obtained by measurement using the same device and method.

It is considered that the ion-exchangeable layered silicate has a portion serving as an active site (acid site) of olefin polymerization at an edge face of a laminated structure thereof. Therefore, the inventors of the present invention considered that when an ion-exchangeable layered silicate having a small average particle diameter, that is, having an increased edge area per unit weight is used, the active site of olefin polymerization is increased with an increase in the edge area, and a highly active catalyst component for olefin polymerization can be obtained. As a result of studies, it has found that an ion-exchangeable layered silicate having a small average particle size and a narrow particle size distribution is a highly active catalyst component for olefin polymerization. Further, the present inventors have found that a polymer having a high molecular weight can be obtained by using the catalyst component for olefin polymerization according to the present embodiment.

It is considered that, even when the average particle diameter is small, when the particle size distribution is wide, that is, when particles having a particle diameter larger than the average particle diameter or particles having a particle diameter smaller than the average particle diameter are contained in a large amount, the following phenomenon occurs, and a highly active catalyst component for olefin polymerization cannot be obtained.

It is considered that when the particles having a particle diameter larger than the average particle diameter are contained in a large amount, the particles having a particle diameter larger than the average particle diameter have a small contribution to an increase in the edge area of the layered silicate and have a small number of portions that can serve as active sites (acid sites), and thus a highly active catalyst component for olefin polymerization cannot be obtained.

On the other hand, in the present invention, as will be described later, a stage of contact with acid in step (4) is essential for the expression of activity. Therefore, when the particles having a particle diameter smaller than the average particle diameter are contained in a large amount, these particles are small in size, and therefore, at the stage of contact with acid, a metal component constituting the octahedral sheet is remarkably eluted, and a function as a catalyst component for olefin polymerization is considered to be impaired.

Due to the above-described phenomenon, it is considered that the ion-exchangeable layered silicate (B) having a wide particle size distribution cannot produce a highly active catalyst component for olefin polymerization.

A function of obtaining a polymer having a high molecular weight has not yet been elucidated, but can be presumed as follows.

In the ion-exchangeable layered silicate having a small number of edge faces, in other words, having a small number of acid sites to serve as active sites for olefin polymerization, a proportion of unactivated metallocene compounds is increased at the stage of contact with the metallocene compound described later. It is considered that these compounds cause a side reaction with a previously activated metallocene compound to form an active site that gives a polymer having a low molecular weight. When an amount of the metallocene compound is reduced in order to prevent the side reaction, the number of active sites is reduced in this case, resulting in low activity.

On the other hand, the ion-exchangeable layered silicate in the present embodiment is an ion-exchangeable layered silicate in which the edge face is increased, that is, the amount of the acid site is increased. Therefore, it is considered that when the ion-exchangeable layered silicate is brought into contact with the metallocene compound, the amount of the metallocene compound to be activated is increased. As a result, it is considered that formation of active sites that give a polymer having a low molecular weight is prevented, and thus a polymer having a high molecular weight can be obtained.

As a result of the above study, the average particle diameter of the second layered silicate (B) needs to be 0.03 μm to 0.4 μm, and is preferably 0.07 μm or more, more preferably 0.10 μm or more, and still more preferably 0.12 μm or more, and is preferably 0.35 μm or less, more preferably 0.30 μm or less, and still more preferably 0.29 μm or less. When the average particle diameter is within the above range, a highly active catalyst component for olefin polymerization is obtained.

The Rosin-Rammler distribution constant n as obtained from the particle size distribution of the second layered silicate (B) is 1.5 or more, preferably 2.0 or more, more preferably 2.41 or more, and still more preferably 2.5 or more. When the Rosin-Rammler distribution constant n as obtained from the particle size distribution is within the above range, a highly active catalyst component for olefin polymerization is obtained. An upper limit of the Rosin-Rammler distribution constant n as obtained from the particle size distribution is not particularly limited, but is preferably 15.0 or less, more preferably 10.0 or less, still more preferably 7.0 or less, and yet still more preferably 5.49 or less.

(3) Step (1) and Step (2) (Preparation of Second Layered Silicate (B))

The second layered silicate (B) used in the production of the catalytic component for olefin polymerization according to the present embodiment may be processed in shape from the first layered silicate (A) by operations such as grinding or classifying, and the grinding is particularly preferable. That is, the aqueous slurry of the second layered silicate (B) or the second layered silicate (B) may be prepared from the first layered silicate (A), respectively, by grinding the aqueous slurry of the ion-exchangeable first layered silicate (A) in the step (1) using a wet bead mill, and grinding the ion-exchangeable first layered silicate (A) in the step (2) using a grinder.

Examples of a grinding style include a dry grinding and wet grinding. Examples of the grinder include a jaw crusher, a gyratory crusher, a roll crusher, an edge runner, a hammer mill, a ball mill, a bead mill, and a jet mill. In the step (2), any of the grinders listed herein can be used.

In the present embodiment, as the grinder, a wet ball mill and a wet bead mill are particularly preferable, and a wet bead mill is further preferable. In the step (1), the wet bead mill listed herein is used.

By using the wet bead mill, the aqueous slurry of the second layered silicate (B) having a small average particle diameter and a narrow particle size distribution can be obtained. In the wet bead mill, since the ion-exchangeable layered silicate is ground in a state of being dispersed in water, it is considered that a grinding stress is efficiently applied to basic particles of the ion-exchangeable layered silicate (first layered silicate (A)), and the grinding in which the edge face is easily increased proceeds. It is considered that it is possible to further prevent a decrease in crystallinity due to grinding by using the wet bead mill.

In the wet bead mill, a material to be ground (first layered silicate (A)) and beads as a medium are charged into a cylindrical grinding chamber called a vessel together with a dispersion medium including a liquid, the beads are stirred by rotating a stirring member (agitator) rotatable in the vessel at a high speed, and a frictional force, a shearing force, and the like generated by the beads are applied to the material to be ground, thereby micronizing the material to be ground.

When the grinding step in the present embodiment is performed using the wet bead mill, the beads to be used are preferably at least one of zirconia and alumina, and among them, zirconia is preferably used.

Factors affecting the grinding efficiency of the wet bead mill include a bead diameter, a bead filling rate, an agitator circumferential speed, a solid content concentration of the ion-exchangeable first layered silicate (A), a slurry flow rate, and the like.

A particle diameter of the beads is preferably 30 μm to 2000 μm, more preferably 50 μm or more, and still more preferably 500 μm or less in order to efficiently make an average particle diameter of the obtained ion-exchangeable second layered silicate (B) to be 0.4 μm or less. The bead filling rate is generally 70% by volume to 95% by volume, preferably 75% by volume or more, and preferably 90% by volume or less. The agitator circumferential speed is generally 5 m/s to 20 m/s, preferably 7 m/s or more, and preferably 18 m/s or less. The solid content concentration of the ion-exchangeable first layered silicate (A) is preferably 0.1% by weight to 70% by weight, more preferably 1% by weight or more, and still more preferably 2% by weight or more, and is more preferably 50% by weight or less, and still more preferably 30% by weight or less. As the dispersion medium, water or an organic solvent such as methanol, ethanol, chloroform, methylene chloride, pentane, hexane, heptane, toluene, and xylene is used. Preferably, water is used as the dispersion medium.

In order to obtain particles that satisfies the characteristic (b1) and the characteristic (b2), that is, particles having a small average particle diameter and a narrow particle size distribution, it is preferable to increase the number of times that the ground slurry passes through the vessel. In order to increase the number of passes with the same residence time, an operation of increasing a flow velocity in pipe of the slurry is considered to be preferable (described in Convertec, December 2014 issue, P74 to P77 (Processing Technology Study Group Co., Ltd.)). The flow velocity in pipe is a velocity of the slurry passing through the vessel, and can be obtained based on slurry supply velocity/cross-sectional area (L/min). The flow velocity in pipe is preferably 0.03 L/min to 1.00 L/min, more preferably 0.10 L/min or more, and even more preferably 0.20 L/min or more, and is more preferably 0.80 L/min or less, and even more preferably 0.60 L/min or less. When the grinding is performed in the above range, it is possible to obtain desired particles having a small average particle diameter and a narrow particle size distribution.

In the past, a catalyst component for olefin polymerization using a ground ion-exchangeable layered silicate has been disclosed, but an ion-exchangeable layered silicate having a small particle diameter and a narrow particle size distribution as basic particles in an aqueous dispersion slurry such as the ion-exchangeable second layered silicate (B) in the present embodiment has not been obtained.

For example, in Patent Literatures 8 to 10, a clay mineral is subjected to a dry grinding. In the dry grinding, since the grinding stress is applied to the aggregated clay mineral, and in all of them, only an aggregation state of the clay mineral is ground, and the basic particles of the aqueous dispersion slurry are not efficiently ground. Therefore, it is not considered to be a preferred grinding style for the present embodiment.

In Patent Literature 5, although the grinding is a wet grinding, excessive stress is applied to the clay particles, and it is not easy to control the stress since the grinding is performed in a mortar. Therefore, there is a possibility that the basic particles in the aqueous slurry of the resulting ground particles become excessively small. Actually, a preferred range of the basic particles disclosed in Patent Literature 5 is also set to 0.01 nm to 20 nm.

As described above, when such particles are used to be brought into contact with acid in the step (4) essential to the present embodiment, which will be described in detail later, a metal component constituting the octahedral sheet of the ion-exchangeable layered silicate is remarkably eluted, and the function as a catalyst component for olefin polymerization is impaired. Therefore, it is considered that a highly active catalyst component for olefin polymerization as in the present embodiment cannot be obtained. Furthermore, the grinding in a mortar is not a grinding method that can endure industrial practical use.

A grinding time is not particularly limited as long as the desired particles can be obtained, but is preferably 5 minutes to 1200 minutes, more preferably 10 minutes or more, and even more preferably 15 minutes or more, and is more preferably 600 minutes or less, and even more preferably 240 minutes or less. When the grinding time is within the above range, particles having a small average particle diameter and a narrow particle size distribution can be obtained without impairing the crystallinity of the ion-exchangeable layered silicate.

Examples of the wet bead mill capable of desired grinding as a grinding device include STAR MILL and MUGEN-FLOW manufactured by Ashizawa Finetech Co., Ltd., a Dyno-Mill manufactured by Willy A. Bachofen, a Neo Alpha Mill and a Bisco Mill manufactured by Aimex Co., Ltd., an MSC MILL and an SC MILL manufactured by Nippon Coke & Engineering Co., Ltd., NANO MILL manufactured by Asada Iron Works Co., Ltd., and an Ultra Apex Mill manufactured by Hiroshima Metal & Machinery Co., Ltd. In particular, the MUGENFLOW manufactured by Ashizawa Finetech Co., Ltd. is preferable.

(4) Step (3)

The step (3) is a step of granulating, by a spray drying, an aqueous slurry of the ion-exchangeable second layered silicate (B) that satisfies the characteristic (b1) and the characteristic (b2) to obtain ion-exchangeable first layered silicate granulated particles (C).

Mechanical properties of the ion-exchangeable layered silicate significantly change depending on a content of water. A certain correlation can be seen between an ion-exchangeable layered silicate concentration in a raw material slurry liquid to be spray-dried and granulated and a slurry viscosity. The aqueous slurry viscosity of the ion-exchangeable second layered silicate (B) is preferably 0.1 cp to 1000 cp, more preferably 1 cp or more, and still more preferably 2 cp or more, and is more preferably 700 cp or less, and still more preferably 200 cp or less. The aqueous slurry viscosity is particularly preferably 2 cp to 200 cp, particularly in an aqueous solvent.

A slurry concentration of the aqueous slurry of the second layered silicate (B) (concentration of the second layered silicate (B)) in the step (3) is not particularly limited, but is preferably 0.1% by weight to 70% by weight, more preferably 1% by weight or more, and still more preferably 2% by weight or more, and is more preferably 50% by weight or less, and still more preferably 40% by weight or less.

When the step (1) or step (2) is provided, the ground slurry obtained in step (1) or step (2) may be used as it is, or may be concentrated or diluted to adjust the concentration and viscosity, as long as the slurry concentration is within the above range. A temperature of a hot air in inlet in the spray drying and granulation varies depending on the dispersion medium. When water is taken as an example, the temperature is preferably 80° C. to 260° C., more preferably 100° C. or more, and more preferably 220° C. or less.

In the granulation, various binders of an organic substance, an inorganic solvent, and an inorganic salt may be used. Examples of the binder include sugar, dextrose, corn syrup, gelatin, glue, carboxymethyl cellulose, polyvinyl alcohol, water glass, magnesium chloride, aluminum sulfate, aluminum chloride, magnesium sulfate, alcohols, glycol, starch, casein, latex, polyethylene glycol, polyethylene oxide, tar, pitch, alumina sol, silica gel, gum arabic, and sodium alginate.

When granulating by a spray drying, at least water is used as a dispersion medium of the raw material slurry. An organic solvent such as methanol, ethanol, chloroform, methylene chloride, pentane, hexane, heptane, toluene, and xylene may be mixed with the dispersion medium. The "aqueous slurry" means a dispersion medium containing 90% by weight or more of water, and does not mean excluding those containing a dispersion medium other than water.

A shape of the second layered silicate (B) is not particularly limited as long as the second layered silicate (B) satisfies the characteristic (b1) and the characteristic (b2) described above, and may be a naturally produced shape, a shape at the time of artificial synthesis, or a shape formed or selected by an operation such as grinding or classifying as described above. Before granulation, the second layered silicate (B) as a raw material is desirably swellable. Swellability can be determined by whether or not an interlayer distance changes when water is added. The second layered silicate (B) before granulation is preferably not subjected to a chemical treatment such as an acid treatment or a salt treatment. However, even in the chemical treatment, a salt treatment performed in a solid state for purification of the second layered silicate (B) as a raw material may be performed.

(5) Characteristic (c1) of First Layered Silicate Granulated Particles (C)

The first layered silicate granulated particles (C) preferably have the following characteristic (c1).

Characteristic (c1): in X-ray diffraction (XRD), a peak (x) is present in a first range of $2\theta$ of 19.0 degrees to 20.0 degrees and a peak (y) is present in a second range of $2\theta$ of 5.0 degrees to 10.0 degrees, and a relationship of $0.27 \leq (Y/X)$ is satisfied, where X is a maximum peak intensity in the first range and Y is a maximum peak intensity in the second range.

The characteristic (c1) shows a form of the ion-exchangeable first layered silicate granulated particles (C). As described above, it is presumed that the ion-exchangeable layered silicate has a portion that can serve as an active site (acid site) of olefin polymerization at the edge face of the laminated structure thereof, and the active site (acid site) is increased as the edge area is increased, thereby the activity is improves. Therefore, it is presumed that the ideal particles having a large edge area have large crystals in a laminating direction of the crystals and small crystals in a plane direction in which layer spreads, and the ion-exchangeable first layered silicate granulated particles (C) also have this structure.

In XRD of the first layered silicate granulated particles (C), a peak (x) appearing in a first range of $2\theta$ of 19.0 degrees to 20.0 degrees indicates a crystal plane (110) of the ion-exchangeable layered silicate of a type classified as smectite, which is derived from crystallinity in a spreading direction of the layer, that is, a planar direction. In addition, a peak (y) appearing in a second range of 2θ of 5.0 degrees to 10.0 degrees indicates a crystal plane (001) of the ion-exchangeable layered silicate of a type classified as smectite, which is derived from crystallinity in a laminating direction, that is, a vertical direction.

Therefore, it can be said that the larger the peak intensity ratio (Y/X) is, the more ideal the ion-exchangeable layered silicate particles with many edge faces, where the maximum peak intensities of the peaks (x) and (y) are X and Y, respectively. The peak intensity ratio (Y/X) of the first layered silicate granulated particles (C) is preferably 0.27 or more, more preferably 0.28 or more, and still more preferably 0.29 or more. Within the above range, a highly active catalyst component for olefin polymerization can be obtained. An upper limit of the peak intensity ratio (Y/X) is not particularly limited, but is preferably 5.00 or less, and more preferably 2.00 or less.

(6) Characteristic (c2) of First Layered Silicate Granulated Particles (C)

The first layered silicate granulated particles (C) preferably have the following characteristic (c2).

Characteristic (c2): In X-ray diffraction (XRD), a peak (z) is not present in a third range of 2θ of 15.0 degrees to 25.0 degrees (except 19.0 degrees to 20.0 degrees which is the first range), or in a case where the peak (z) is present in the third range, a relationship between the maximum peak intensity Z of the peak (z) and the peak intensity X satisfies 0<(Z/X)≤1.6, provided that a plurality of peaks (z) may be present, and when a plurality of peaks (n peaks) are present, 0<[(total sum of Zn/X)]≤1.6 is satisfied with respect to a total sum of ratios (Zn/X) of each peak intensity to X, where Zn is peak intensity of each of the n peaks.

The third range in the characteristic (c2) has the same contents as "2θ=15.0 degrees or more and less than 19.0 degrees and more than 20.0 degrees and 25.0 degrees or less".

The characteristic (c2) indicates an extent to which impurities are contained in the first layered silicate granulated particles (C) used in the method for producing a catalyst component for olefin polymerization according to the present embodiment.

The peak (x) also represents the presence or absence of a component of the ion-exchangeable layered silicate necessary for exhibiting performance as a catalyst for olefin polymerization. Examples of the component include mica, vermiculite, and smectite. Among them, mica and smectite are preferable, and smectite is particularly preferable. Further, among smectites, montmorillonite and beidellite are preferable, and montmorillonite is particularly preferable On the other hand, the peak (z) indicates a component other than a component of the ion-exchangeable layered silicate necessary for exhibiting performance as a catalyst for olefin polymerization, and it is presumed that the peak (z) indicates the presence or absence of a component to be contained as a so-called impurity. Therefore, in order to maintain high performance, it is preferable that the peak (z) is not present, or even when the peak (z) is present, a ratio (Z/X) of Z to X satisfies a relationship 0<[(total sum of Z/X)]≤1.6, where Z is the maximum peak intensity of the peak (z), and X is the maximum peak intensity of the peak (x).

Here, when the peak (z) is not present, the peak intensity ratio (Z/X) to the peak (x) is represented by 0. The peak (z) may be a single peak or a plurality of peaks. When the peak (z) is a single peak, the peak intensity ratio (Z/X) is the peak intensity ratio (Z/X) obtained for the peak. When there are n peaks (z) (n is an integer of 2 or more), i.e., when there are a plurality of peaks (z), each peak intensity ratio (Zn/X), which is a ratio of the maximum peak intensity (Zn) of each peak (z)n to the maximum peak intensity (X) of the peak (x), is obtained, and the sum thereof is the peak intensity ratio (Z/X). For example, when there are three peaks, each peak intensity ratio (Zn/X) described above is as follows.

When the respective maximum peak intensities are (Z1), (Z2), and (Z3), the numerical value shown as the peak intensity ratio (Z/X) can be obtained by the following formula.

$$\{(Z1/X)+(Z2/X)+(Z3/X)\}$$

An upper limit of the peak intensity ratio (Z/X) is preferably 1.6, more preferably 1.4 or less, still more preferably 1.2 or less, yet still more preferably 1.0 or less, particularly preferably 0.95 or less, and most preferably 0.9 or less. The smaller the value of the peak intensity ratio (Z/X) is, the more preferable. Specifically, a lower limit of the peak intensity ratio (Z/X) may be 0.5 or more, may be 0.1 or more, may be 0.05 or more, may be 0.01 or more, and may be 0.001 or more, the closer to 0 (zero) the lower limit is, the more preferable, and the lower limit is most preferably 0 (zero).

Next, a method of measuring XRD for obtaining the characteristic (c1) and the characteristic (c2) and a method of obtaining the peak intensity from the results obtained therefrom will be described.

In the XRD measurement method, a Cu—Kα ray (using Kβ absorption plate) is used as an X-ray source, a tube voltage is set to 40 kV, and a tube current is set to 30 mA. An optical system is a concentration method. A divergence slit of 2/3 degrees, a scattering slit of 2/3 degrees, a light receiving slit of 0.300 mm, a scan mode of 2θ/θ scan, a 2θ scan range of 3.0000 degrees to 55.0000 degrees, an angle step width of 0.0200 degrees, a scan speed of 4.0000 degrees/min, and a detector scintillation counter are used, and a glass holder having a depth of 0.2 mm is used as a sample holder. As the device, an X-ray Diffractometer Smartlab manufactured by Rigaku Corporation is used.

A procedure for obtaining the maximum peak intensities X, Y, and Z of the respective peaks (x), (y), and (z) from the measurement results obtained under the above conditions will be described.

The X-ray diffraction intensity is obtained as the number of counts of the scintillation counter with respect to 2θ. The maximum peak intensity X of the peak (x) appearing in the first range of 2θ of 19.0 degrees to 20.0 degrees is obtained by the following method.

As a base line for a diffraction intensity, an intensity average value in a range off 0.1 degrees around 2θ of 15.0 degrees and 25.0 degrees (which is an average of 11 points because an angle step is 0.02 degrees) is taken, and is defined as the intensity at 2θ of 15.0 degrees and 25.0 degrees. A straight line is drawn so as to connect these two points, and is set as a base line.

When any diffraction peak from the sample appears in the range of 2θ of 15.0 degrees±0.1 degree and 25.0 degrees±0.1 degree, a 2θ position having no peak is searched in a range of several degrees around each of the peaks so as to avoid the peak, and the 2θ position and the intensity of the baseline are determined at the position. Determination of the presence or absence of a peak is performed by plotting the measured diffraction intensity in a range of 2θ of 14.0 degrees to 26.0 degrees and applying a peak search of a local maximum method with 20 points.

The diffraction intensity obtained by subtracting the base line obtained above is plotted in a range of 2θ of 15.0 degrees to 25.0 degrees, and the peak search is performed by the local maximum method with 20 points and a filter with a threshold value of 20% (those less than 20% of the maximum intensity value are not regarded as peaks). The maximum peak intensity in the first range of 2θ of 19.0 degrees to 20.0 degrees obtained by the search is set as the peak intensity X of the peak (x), all (n) peaks in the third range of 2θ of 15.0 degrees to 25.0 degrees excluding the first range are set as the peaks (z1) to (zn), and the maximum peak intensity of each peak is set as the peak intensities Z1 to Zn of the peaks (z1) to (zn).

The maximum peak intensity Y of the peak (y) appearing in the second range of 2θ of 5.0 degrees to 10.0 degrees is determined by the following method.

As a base line for a diffraction intensity, an intensity average value in a range of ±0.1 degrees around 2θ of 4.0 degrees and 10.0 degrees (which is an average of 11 points because an angle step is 0.02 degrees) is taken, and is defined as the intensity at 2θ of 4.0 degrees and 10.0 degrees. A straight line is drawn so as to connect these two points, and is set as a base line.

When any diffraction peak from the sample appears in the range of 2θ of 4.0 degrees±0.1 degree and 10.0 degrees±0.1 degree, a 2θ position having no peak is searched in a range of several degrees around each of the peaks so as to avoid the peak, and the 2θ position and the intensity of the baseline are determined at the position. Determination of the presence or absence of a peak is performed by plotting the measured diffraction intensity in a range of 2θ of 3.0 degrees to 11.0 degrees and applying the peak search of the local maximum method with 20 points.

(7) Characteristic (c3) of First Layered Silicate Granulated Particles (C)

The first layered silicate granulated particles (C) used in the method for producing a catalyst component for olefin polymerization according to the present embodiment preferably further have the following characteristic (c3).

Characteristic (c3): by using Si, Al, Mg, Fe, and Na quantified by fluorescent X-ray analysis and Ca and K quantified by ICP emission spectroscopic analysis, x and y are obtained, which indicate a ratio of the number of atoms in the general formula of a chemical composition of dioctahedral smectite: $(M^+, M^{2+}_{1/2})_{x+y}(Y^{3+}_{2-y}, Y^{2+}_y)(Si_{4-x}, Al_x)O_{10}(OH)_2 \cdot nH_2O$, and when the general formula is completed, a ratio of an amount of Si component (Si(s)) in the general formula to an amount of all quantified Si components (Si(t)), Si(s)/Si(t), is 0.50 to 1.00.

The ratio of the number of atoms in the general formula is the number described at a lower right of an element. A detailed method of determining Si(s)/Si(t) is described in JP-A-2018-111841.

(8) Characteristic (c4) of First Layered Silicate Granulated Particles (C)

The first layered silicate granulated particles (C) used in the method for producing a catalyst component for olefin polymerization according to the present embodiment preferably further have the following characteristic (c4).

Characteristic (c4): the first layered silicate granulated particles (C) have a high amount of isomorphic substitution.

For example, a molar ratio (Mg/Al) of an amount of Mg to an amount of Al contained in the octahedral sheet of the ion-exchangeable layered silicate is preferably 0.28 or more, more preferably 0.285 or more, further preferably 0.287 or more, further preferably 0.29 or more, and particularly preferably 0.292 or more. The molar ratio is more preferably 3.5 or less, still more preferably 2.5 or less, yet still more preferably 1.5 or less, even more preferably 1 or less, and is particularly preferably 0.8 or less, and most preferably 0.5 or less.

As described above, when trivalent aluminum is substituted with divalent magnesium, the first layered silicate granulated particles (C) have a negative layer charge. Further, the present inventors consider that with respect to the performance (activity) of the metallocene catalyst, the negative layer charge acts as a counter anion for allowing cation species of the metallocene compound (complex), which is an active site precursor of the metallocene catalyst, to stably exist as an active site, and can enhance the stability as a catalyst for olefin polymerization.

A Mg/Al molar ratio can be determined from a chemical structural formula. The chemical structural formula is obtained by quantifying atoms contained therein by a general chemical analysis method such as X-ray fluorescence analysis (XRF), ICP, or absorptiometry, and determining the chemical structural formula based on the quantitation.

The calculation method is generally performed by a method described in Clay Handbook 3rd Edition (Clay Science Society of Japan, Gihodo Shuppan Co., Ltd., published on 2009, P272 to P274). By determining the chemical structural formula by such a method, the cations of each sheet and types of cations that isomorphically substitute the cations are clarified.

As one of the calculation methods, a calculation method based on the number of charges of anions, which is often used, will be described below.

A molecular ratio of each component obtained by chemical analysis is multiplied by the number of charges of cations contained in oxide of the atom (for example, the number of charges is 4 in the case of Si) to obtain the number of cations, and the total number of cations is obtained. Next, in order to obtain a coefficient for balancing the cation charge and the anion charge, the number of negative charges (O contained in the clay mineral) 22 in the structure is divided by the total number of cations. By multiplying the coefficient obtained in this manner by the number of cations of each atom obtained in advance, the ratio of atoms contained in the structure can be calculated, and the structural formula can be completed. In this way, the molar ratio Mg/Al of magnesium to aluminum in the octahedral sheet can be determined.

(9) Step (4)

The step (4) is a step of bringing the first layered silicate granulated particles (C) obtained in the step (3) into contact with acid to obtain chemically treated ion-exchangeable second layered silicate granulated particles (D).

The acid used in step (4) is not particularly limited. Among the acids, inorganic acid is preferable.

A phenomenon occurring in the step (4) will be described in detail.

When the ion-exchangeable layered silicate is brought into contact with acid, impurities on the surface are acid-washed. In addition to being acid-washed, elution of interlayer ions and exchange with hydrogen cations occur by acid, and then cations constituting the octahedral sheet are eluted. In the process of the elution, characteristics such as an acid site, a pore structure, and a specific surface area change. In particular, it has already been revealed that an amount of acid sites required for activating the metallocene compound is significantly increased through the step (4) (Clay Science, 20, 49-58 (2016)).

Therefore, in the method for producing a catalyst component for olefin polymerization according to the present embodiment, it is essential to bring the first layered silicate granulated particles (C) into contact with acid. A degree of elution varies depending on an acid concentration, a treatment time, and a type of acid, but magnesium-rich ones are generally the largest, followed by iron-rich ones and aluminum-rich ones. As the crystallinity is higher and the particles are larger, the elution property is lower, which relates to a fact that the acid penetrates between crystal layers or into the crystal structure.

As the elution mechanism, a mechanism of uniform elution which is considered to generate a uniform structure having micro voids in all the octahedral sheets of the crystal lattice, and a mechanism of non-uniform elution in which a complex of silicic acid and layered silicate is generated by elution of metal cations at a specific site, are considered.

A temperature as a condition of the acid treatment for the contact treatment with acid is not particularly limited, but is preferably 40° C. to 102° C., more preferably 50° C. or higher, and even more preferably 60° C. or higher, and is more preferably 100° C. or lower, and even more preferably 95° C. or lower. When the temperature is lowered too much, an elution rate of cations is extremely lowered, and the production efficiency is lowered. On the other hand, when the temperature is excessively increased, safety in operation is reduced.

An acid concentration during the acid treatment, that is, a weight percentage of the acid with respect to the total weight of the reaction system is not particularly limited, but is preferably 3% by weight to 30% by weight, more preferably 5% by weight or more, and still more preferably 7% by weight or more, and is more preferably 25% by weight or less, and still more preferably 20% by weight or less. When the concentration is too low, the elution rate of cations is decreased, and the production efficiency is decreased.

A concentration of the ion-exchangeable layered silicate is not particularly limited, but is preferably 3% by weight to 50% by weight, and more preferably 5% by weight or more, and is more preferably 30% by weight or less, and still more preferably 20% by weight or less. When the concentration is too low, a large facility is required for industrial production. On the other hand, when the concentration is too high, the viscosity of the slurry is increased, uniform stirring and mixing becomes difficult, and the production efficiency is also reduced.

The number of times of the acid treatment is not particularly limited, and the acid treatment may be performed once or in a plurality of times.

An acid compound which is an acid to be used is not particularly limited, and preferable examples thereof include inorganic acids such as hydrochloric acid, sulfuric acid, nitric acid, oxalic acid, benzoic acid, stearic acid, propyrionic acid, fumaric acid, maleic acid, and phthalic acid, and organic acids. Among them, inorganic acid is preferable, and among the inorganic acids, hydrochloric acid, nitric acid and sulfuric acid are more preferable, hydrochloric acid and sulfuric acid are more preferable, and sulfuric acid is particularly preferable.

It is preferable to elute, by the chemical treatment which is the acid treatment, the metal cations constituting the octahedral sheet by 10 mol % to 65 mol % with respect to a content before the chemical treatment. An elution amount is more preferably 15 mol % or more, further preferably 17 mol % or more, and still further preferably 20 mol % or more, and is more preferably 60 mol % or less, further preferably 55 mol % or less, and particularly preferably 50 mol % or less. Within this range, a sufficient amount of pores is ensured, a surface area is sufficiently large, and the desired first layered silicate granulated particles (C) are easily obtained.

Here, a ratio (mol %) of eluted metal cations is represented by the following formula, for example, when the metal cations are aluminum.

$$[\text{Aluminum/silicon (molar ratio) before chemical treatment} -$$
$$\text{aluminum/silicon (molar ratio) after chemical treatment}]/$$
$$[\text{aluminum/silicon (molar ratio) before chemical treatment}] \times 100$$

After performing the chemical treatment above, a treatment in step (5) described later may be subsequently performed, or washing may be performed. In general, a liquid such as water or an organic solvent is used for washing. The washing is not essential, and the washing may be performed or may not be performed.

In the case of washing, washing may be performed at a washing ratio of 1/1000 or less, or may be performed at a washing ratio of more than 1/1000. The washing ratio refers to a value expressed by "(amount of acids before dilution+ amount of diluent−amount of removed diluent)/(amount of acids before dilution+amount of diluent)". For example, when the amount of the acids before dilution is 1, 99 diluents (solvents) are added as a washing operation to uniformly dilute the acids, and then the 99 diluted solution is removed, the washing ratio is 1/100. After washing, dehydration is preferably performed.

After the washing and dehydration, the treatment in step (5) described later may be performed, or drying may be performed. The drying is preferably performed so as not to cause structural destruction of the second layered silicate granulated particles (D). A drying temperature is not particularly limited, but is preferably 100° C. to 800° C., and more preferably 150° C. or more, and is more preferably 600° C. or less, and still more preferably 300° C. or less. By setting the drying temperature to 800° C. or less, structural destruction of the second layered silicate granulated particles (D) is less likely to occur, which is preferable.

In general, since the properties of the ion-exchangeable layered silicate change depending on the drying temperature even when the structure is not destroyed, it is preferable that the drying temperature of the second layered silicate granulated particles (D) is changed depending on the use.

A drying time is usually 1 minute to 24 hours, preferably 5 minutes or more, and preferably 4 hours or less. A drying atmosphere is preferably dry air, dry nitrogen, dry argon, or reduced pressure.

A drying method is not particularly limited, and various methods can be used.

Furthermore, generally, the ion-exchangeable layered silicate includes adsorbed water and interlayer water. In the present embodiment, it is preferable to remove the adsorbed water and the interlayer water before use.

In order to remove water, a heating treatment is usually used. The method is not particularly limited, but it is preferable to select a condition in which adsorbed water and interlayer water do not remain, or a condition in which structural destruction does not occur.

A heating time is not particularly limited, but is preferably 0.1 hours or more, and more preferably 0.2 hours or more. At this time, the water content of the layered silicate after removal is preferably 3% by weight or less, and more preferably 1% by weight or less when the water content of the layered silicate after dehydration for 2 hours under conditions of a temperature of 200° C. and a pressure of 1 mmHg is set to 0% by weight.

(10) Characteristic of Second Layered Silicate Granulated Particles (D)

The second layered silicate granulated particles (D) obtained in the step (4) preferably have a specific surface area of 350 m$^2$/g or more.

The specific surface area represents a spatial size required for supporting an active site precursor on the ion-exchangeable layered silicate and proceeding the polymerization reaction as the active site, and is preferably large. When the specific surface area is increased, the active site precursor is sufficiently supported, and a reaction surface for the progress of the polymerization reaction can be sufficiently secured, so that the activity is further improved. On the other hand, when the specific surface area is too large, the particles become brittle and cannot maintain the shape, and the powder properties may be deteriorated. Further, when the catalyst is crushed or disintegrated during polymerization, fine powder or lumps are generated, which may lead to a decrease in operation stability of the plant.

A lower limit of the specific surface area is preferably 350 m$^2$/g, more preferably 360 m$^2$/g, still more preferably 375 m$^2$/g, particularly preferably 390 m$^2$/g. An upper limit of the specific surface area is not particularly limited, but preferably 800 m$^2$/g, more preferably 700 m$^2$/g, and still more preferably 600 m$^2$/g.

As the upper limit and the lower limit of the specific surface area, a range in which the preferable lower limit value and the preferable upper limit value are arbitrarily combined can be exemplified. For example, the range is 350 m$^2$/g to 800 m$^2$/g, 350 m$^2$/g to 700 m$^2$/g, 350 m$^2$/g to 600 m$^2$/g, 375 m$^2$/g to 800 m$^2$/g, 375 m$^2$/g to 600 m$^2$/g, 390 m$^2$/g to 800 m$^2$/g, and 390 m$^2$/g to 600 m$^2$/g.

Here, a method of measuring a pore diameter and a pore volume by the nitrogen adsorption method will be described below.

As for an adsorption amount of gas on a solid, when the temperature is constant and the solid and gas are determined, a potential of adsorption interaction can be considered to be almost constant, and thus the adsorption amount is a function of only a pressure, which is generally referred to as an adsorption isotherm.

In the present embodiment, nitrogen, which is most commonly used when evaluating the specific surface area, is used as adsorption gas, and the adsorption isotherm is measured at a liquid nitrogen temperature (temperature: 77K) and a relative pressure P/P0 (P0 represents atmospheric pressure) in a range of 0.025 to 0.995.

The specific surface area is determined by performing BET multipoint analysis using the adsorption isotherm obtained as described above. In general, the analysis is performed in a range in which a good straight line is obtained in the vicinity of the relative pressure P/P0 (P0 is an atmospheric pressure) of 0.05 to 0.35, and an analysis range is determined while checking a BET plot.

(11) Step (5)

The method for producing a catalyst component for olefin polymerization preferably includes the following step (5):

step (5): bringing the obtained second layered silicate granulated particles (D) into contact with at least one of a base and a salt to obtain chemically treated ion-exchangeable third layered silicate granulated particles (E).

The number of times of contact between the second layered silicate granulated particles (D) and at least one of a base and a salt may be one or more.

As a common influence of contact between the second layered silicate granulated particles (D) and at least one of a base and a salt, exchange of interlayer cations is exemplified. Besides, various chemical treatments have the following various effects.

In an alkali treatment with bases, a crystal structure of the ion-exchangeable layered silicate is destroyed, resulting in a change in the structure of the ion-exchangeable layered silicate.

In the intercalation or the salt treatment, an ion complex, a molecular complex, an organic derivative, or the like is formed, and a surface area or an interlayer distance can be changed. It is also possible to obtain a layered substance in a state in which an interlayer distance is expanded by utilizing ion exchangeability and replacing interlayer exchangeable ions with other large bulky ions. That is, the bulky ions play a supporting function to support the layered structure, and are called pillars.

Specific examples of the bases and salts are shown below. In the present embodiment, a combination of two or more selected from the group consisting of the following salts and bases may be also used as a treatment agent. These salts, alkalis, and compounds which can intercalates between the layers of the ion-exchangeable layered silicate may be also a combination of two or more thereof.

(i) Salts

Examples of the salts include salts composed of a cation selected from the group consisting of an organic cation, an inorganic cation, and a metal ion, and an anion selected from the group consisting of an organic anion, an inorganic anion, and a halide ion. For example, preferred examples thereof include a compound composed of a cation containing at least one atom selected from Groups 1 to 14 of a Periodic Table and at least one anion selected from the group consisting of a halogen anion, an inorganic Bronsted acid, and an organic Bronsted acid anion. Particularly preferred is a compound where an anion contains an inorganic Bronsted acid or a halogen.

Specific examples of the salts are illustrated below, but the salts are not limited thereto. Specific examples of the salts include LiCl, LiBr, Li$_2$SO$_4$, Li$_3$(PO$_4$), LiNO$_3$, Li(OCOCH$_3$), NaCl, NaBr, Na$_2$SO$_4$, Na$_3$(PO$_4$), NaNO$_3$, Na(OCOCH$_3$), KCl, KBr, K$_2$SO$_4$, K$_3$(PO$_4$), KNO$_3$, K(OCOCH$_3$), CaCl$_2$, CaSO$_4$, Ca(NO$_3$)$_2$, Ca$_3$(C$_6$H$_5$O$_7$)$_2$, Ti(OCOCH$_3$)$_4$, Ti(CO$_3$)$_2$, Ti(NO$_3$)$_4$, Ti(SO$_4$)$_2$, TiF$_4$, TiCl$_4$, TiBr$_4$, TiI$_4$, Zr(OCOCH$_3$)$_4$, Zr(CO$_3$)$_2$, Zr(NO$_3$)$_4$, Zr(SO$_4$)$_2$, ZrF$_4$, ZrCl$_4$, ZrBr$_4$, ZrI$_4$, ZrOCl$_2$, ZrO(NO$_3$)$_2$, ZrO(ClO$_4$)$_2$, ZrO(SO$_4$), Hf(OCOCH$_3$)$_4$, Hf(CO$_3$)$_2$, Hf(NO$_3$)$_4$, Hf(SO$_4$)$_2$, HfOCl$_2$, HfF$_4$, HfCl$_4$, HfBr$_4$, and HfI$_4$.

Specific examples of other salts include Cr(OCOCH$_3$)$_2$OH, Cr(CH$_3$COCHCOCH$_3$)$_3$, Cr(NO$_3$)$_3$, Cr(ClO$_4$)$_3$, CrPO$_4$, Cr$_2$(SO$_4$)$_3$, CrO$_2$Cl$_2$, CrF$_3$, CrCl$_3$, CrBr$_3$, CrI$_3$, MoOCl$_4$, MoCl$_3$, MoCl$_4$, MoCl$_5$, MoF$_6$, MoI$_2$, WCl$_4$, WCl$_6$, WF$_6$, WBr$_5$, Mn(OCOCH$_3$)$_2$, Mn(CH$_3$COCHCOCH$_3$)$_3$, MnCO$_3$, Mn(NO$_3$)$_2$, MnO, Mn(ClO$_4$)$_2$, MnF$_2$, MnCl$_2$, MnBr$_2$, MnI$_2$, Fe(OCOCH$_3$)$_2$, Fe(CH$_3$COCHCOCH$_3$)$_3$, FeCO$_3$, Fe(NO$_3$)$_3$, Fe(ClO$_4$)$_3$, FePO$_4$, FeSO$_4$, Fe$_2$(SO$_4$)$_3$, FeF$_3$, FeCl$_3$, MnBr$_3$, FeI$_3$, FeC$_6$H$_5$O$_7$, Co(OCOCH$_3$)$_2$, Co(CH$_3$COCHCOCH$_3$)$_3$, COCO$_3$, CO(NO$_3$)$_2$, CoC$_2$O$_4$, CO(ClO$_4$)$_2$, CO$_3$(PO$_4$)$_2$, COSO$_4$, CoF$_2$, CoCl$_2$, CoBr$_2$, COI$_2$, NiCO$_3$, Ni(NO$_3$)$_2$, NiC$_2$O$_4$, Ni(ClO$_4$)$_2$, NiSO$_4$, NiCl$_2$, and NiBr$_2$.

Specific examples of other salts include CuCl$_2$, CuBr$_2$, Cu(NO$_3$)$_2$, CuC$_2$O$_4$, Cu(ClO$_4$)$_2$, CuSO$_4$, Cu(OCOCH$_3$)$_2$, Zn(OCOCH$_3$)$_2$, Zn(CH$_3$COCHCOCH$_3$)$_2$, ZnCO$_3$, Zn(NO$_3$)$_2$, Zn(ClO$_4$)$_2$, Zn$_3$(PO$_4$)$_2$, ZnSO$_4$, ZnF$_2$, ZnCl$_2$, ZnBr$_2$, ZnI$_2$, AlF$_3$, AlCl$_3$, AlBr$_3$, AlI$_3$, Al$_2$(SO$_4$)$_3$, Al$_2$(C$_2$O$_4$)$_3$, Al(CH$_3$COCHCOCH$_3$)$_3$, Al(NO$_3$)$_3$, AlPO$_4$, GeCl$_4$, Sn(OCOCH$_3$)$_4$, Sn(SO$_4$)$_2$, SnF$_4$, and SnCl$_4$.

Examples of the organic cation constituting the salt include, but are not limited to, ammonium compounds such as trimethyl ammonium, triethyl ammonium, tripropyl ammonium, tributyl ammonium, dodecyl ammonium, N,N-dimethylanilinium, N,N-diethylanilinium, N,N-2,4,5-pentamethylanilinium, N,N-dimethyloctadecyl ammonium, octadodecyl ammonium, N,N-dimethyl-p-n-butylanilinium, N,N-dimethyl-p-trimethylsilylanilinium, N,N-dimethyl-1-naphthylanilinium, N,N,2-trimethylanilinium, and 2,6-dimethylanilinium; nitrogen-containing aromatic compounds such as pyridinium, quinolinium, N-methylpiperidinium, 2,6-dimethylpyridinium, and 2,2,6,6-tetramethylpiperidinium; oxonium compounds such as dimethyl oxonium, diethyl oxonium, diphenyl oxonium, flainium, and oxolonium; phosphonium compounds such as triphenyl phosphonium, tri-o-tolylphosphonium, tri-p-tolylphosphonium, and trimesitylphosphonium; and phosphorus-containing aromatic compounds such as phosphabenzonium and phosphanaphthalenium.

(ii) Bases

The basics refer to, for example, a substance that exhibits alkalinity in a form of an aqueous solution. A definition of alkalinity refers to that a value of pH measured with a pH meter is more than 7, or the property of changing color to blue upon contact with red Ritomass paper. The bases refer to a substance having alkalinity, in a broad sense, a substance corresponding to a base as defined by Arrhenius. More specifically, examples thereof include ammonia, amines, and a hydroxide of a metal such as an alkali metal and an alkaline earth metal. The bases are preferably a hydroxide of a metal, and more preferably a hydroxide of an alkali metal or an alkaline earth metal.

Specific examples of the bases are illustrated below, but the bases are not limited thereto.

Specific examples of the bases include lithium hydroxide, sodium hydroxide, potassium hydroxide, magnesium hydroxide, calcium hydroxide, cesium hydroxide, strontium hydroxide, ammonia, methylamine, dimethylamine, and trimethylamine. Among them, lithium hydroxide, sodium hydroxide, potassium hydroxide, magnesium hydroxide, and calcium hydroxide are preferable, and lithium hydroxide and sodium hydroxide are more preferable.

The salts and bases may be used alone or in combination of two or more thereof. The salts may be used in combination with the bases, and the salts and the bases may be used in combination with acid, a compound intercalating between layers of an ion-exchangeable layered silicate, or the like. At the start of the treatment, a treatment agent previously combined as described above may be used, or a component to be combined may be added during the treatment.

In a chemical treatment with a treatment agent containing at least one of the bases and the salts described above, a treatment agent solution may be used in which at least one of the bases and the salts is dissolved in an appropriate solvent, or a treatment agent solution containing a base as a solvent may be used.

The treatment agent solution is preferably in a liquid state rather than a solid state. This is because, since the chemically treated ion-exchangeable second layered silicate granulated particles (D) are solid, uniform progress is difficult in the reaction between solid and solid. In view of efficient and uniform reaction, the reaction is preferably performed in the form of a solid (layered silicate)-liquid (solution of bases) slurry.

A solvent that can be used in the treatment agent is not particularly limited, and examples thereof include water, alcohols, aliphatic hydrocarbons, aromatic hydrocarbons, esters, ethers, ketones, aldehydes, furans, amines, dimethylsulfoxide, and dimethylformamide. Preferred are water, alcohols, aliphatic hydrocarbons, aromatic hydrocarbons, esters, and ethers, more preferred are water, alcohols, aliphatic hydrocarbons, and ethers, and particularly preferred are water and alcohols. A total concentration of the bases and salts in the treatment agent is preferably about 0.1% by weight to 100% by weight, more preferably about 5% by weight or more, and still more preferably about 50% by weight or less. When the concentration is within the range, there is an advantage that a time required for the processing is shortened and the production can be efficiently performed.

A lower limit of a temperature at the time of performing the step (5) is not particularly limited, but is preferably 20° C. or more, more preferably 30° C. or more, still more preferably 40° C. or more, and particularly preferably 55° C. or more. An upper limit of the temperature is not particularly limited, but is preferably 90° C. or lower, more preferably 80° C. or lower, still more preferably 70° C. or lower, and particularly preferably 62° C. or lower. Within this temperature range, the desired reaction proceeds smoothly.

A lower limit of a time for performing the step (5) is not particularly limited, but is preferably 30 minutes or more, more preferably 60 minutes or more, and still more preferably 90 minutes or more. An upper limit of the time is not particularly limited, but is preferably 720 minutes or less, more preferably 600 minutes or less, still more preferably 480 minutes or less, and particularly preferably 240 minutes or less.

After the step (5) is performed, washing is preferably performed. A solvent used for washing is preferably the same kind as the solvent used for the reaction, and more preferably water or alcohols are used. A washing rate is preferably 1/5 to 1/1000, more preferably 1/10 or less, and even more preferably 1/100 or more. After washing, dehydration is preferably performed.

After washing and dehydration, drying is performed. The drying is preferably performed so as not to cause structural destruction of the ion-exchangeable third layered silicate granulated particles (E). In general, a drying temperature is 100° C. to 800° C., preferably 150° C. or higher, particularly preferably 150° C. or higher, and preferably 600° C. or lower, particularly preferably 300° C. or lower.

The characteristics of the chemically treated ion-exchangeable third layered silicate granulated particles (E) are changed depending on the drying temperature even when the structure is not destroyed, and thus it is preferable to change the drying temperature depending on the application.

A drying time is usually 1 minute to 24 hours, preferably 5 minutes or more, and preferably 4 hours or less. A drying atmosphere is preferably dry air, dry nitrogen, dry argon, or reduced pressure. A drying method is not particularly limited, and various methods can be used.

(12) Characteristic (e1) of Ion-exchangeable Third Layered Silicate Granulated Particles (E)

The third layered silicate granulated particles (E) in the method for producing a catalyst component for olefin polymerization according to the present embodiment preferably satisfy the following characteristic (e1).

Characteristic (e1): an acid site is provided.

A lower limit of an amount of the acid site is that a strong acid site having a pKa of −8.2 or less is preferably 20 μmol or more, more preferably 30 μmol or more, and still more preferably 35 μmol or more, with respect to 1 g of the third layered silicate granulated particles (E).

The amount of the acid site having a pKa of −8.2 or less can be determined mechanically while quantifying coloring of an indicator in a visible ultraviolet spectrum as in Examples described later. Acid is one category of classification of a substance, and is defined as a substance which is Bronsted acid or Lewis acid. The acid site is defined as a constituent unit in which the substance exhibits a property as acid, and the amount thereof is grasped by a molar amount of an indicator solution titration per unit weight by an analysis method such as a titration method. The acid site having a pKa of −8.2 or less is referred to as the "strong acid site".

The measurement of the strong acid site is preferably performed by the following method. In a nitrogen atmosphere, 0.2 g of a sample and 2 mL of toluene are added to a test tube to prepare a slurry. A 0.01 mol/L toluene titration solution of anthraquinone, which is an indicator of an amount of acid having a pKa of −8.2 or less, is separately prepared, and 50 μL of the above 0.01 mol/L toluene titration solution of anthraquinone is added thereto by an automatic titration device (GT-100 manufactured by Dia Instruments Co., Ltd.). An amount of anthraquinone required until the peak intensity of an absorption peak (430 nm) of yellow, which is acidic color of the indicator, does not change by an ultraviolet-visible absorptiometer (PMA-11 manufactured by Hamamatsu Photonics K.K.) is defined as the amount of the acid site having a pKa of −8.2 or less.

(13) Preferred Example of Method for Producing Catalyst Component for Olefin Polymerization Preferred two examples of the method for producing a catalyst component for olefin polymerization will be described. In the method for producing a catalyst component for olefin polymerization, only the step (3) and the step (4) are essential steps, and other steps (the step (1), the step (2), and the step (5)) are an optional step.

(i) Preferred Example A

A preferred example A is a method for producing a catalyst component for olefin polymerization, which includes the following steps (1), (3), (4), and (5) in this order:
- step (1): grinding an aqueous slurry of an ion-exchangeable first layered silicate (A) by a wet bead mill to obtain an aqueous slurry of the second layered silicate (B); and
- step (3): granulating, by a spray drying, an aqueous slurry of an ion-exchangeable second layered silicate (B) that satisfies the following characteristic (b1) and characteristic (b2) to obtain ion-exchangeable first layered silicate granulated particles (C),
  - characteristic (b1): an average particle diameter is 0.03 μm to 0.4 μm,
  - characteristic (b2): a Rosin-Rammler distribution constant n determined from a particle size distribution is 1.5 or more,
- step (4): bringing the obtained first layered silicate granulated particles (C) into contact with acid to obtain chemically treated ion-exchangeable second layered silicate granulated particles (D), and
- step (5): bringing the obtained second layered silicate granulated particles (D) into contact with at least one of a base and a salt to obtain chemically treated ion-exchangeable third layered silicate granulated particles (E).

(ii) Preferable Example B

Preferred Example B is a method for producing a catalyst component for olefin polymerization, which includes the following steps (2), (3), (4) and (5) in this order:
- step (2): grinding an ion-exchangeable first layered silicate (A) with a grinder to obtain the second layered silicate (B),
- step (3): granulating, by a spray drying, an aqueous slurry of an ion-exchangeable second layered silicate (B) that satisfies the following characteristic (b1) and characteristic (b2) to obtain ion-exchangeable first layered silicate granulated particles (C),
  - characteristic (b1): an average particle diameter is 0.03 μm to 0.4 μm,
  - characteristic (b2): a Rosin-Rammler distribution constant n determined from a particle size distribution is 1.5 or more,
- step (4): bringing the obtained first layered silicate granulated particles (C) into contact with acid to obtain chemically treated ion-exchangeable second layered silicate granulated particles (D), and step (5): bringing the obtained second layered silicate granulated particles (D) into contact with at least one of a base and a salt to obtain chemically treated ion-exchangeable third layered silicate granulated particles (E).

2. Method for Producing Catalyst for Olefin Polymerization

The method for producing a catalyst for olefin polymerization is characterized in that the following components (I) and (II) are brought into contact with each other.

Component (I): the catalyst component for olefin polymerization obtained by a method described in "1. Method for Producing Catalyst Component for Olefin Polymerization"

Component (II): a metallocene compound.

A preferred embodiment of the method in the component (I) is the same as the preferred embodiment of "1. Method for Producing Catalyst Component for Olefin Polymerization".

In the method for producing a catalyst for olefin polymerization, the following component (III) can be brought into contact with the component (I) and the component (II).

Component (III): an organoaluminum compound.

In the method for producing a catalyst for olefin polymerization, an α-olefin having 2 to 20 carbon atoms may be further brought into contact with the component (I) and the component (II).

(1) Component (II): Metallocene Compound

A metallocene compound as the component (II) is preferably a metallocene compound of a transition metal of Group 4 of the Periodic Table, and more preferably a metallocene compound having at least one conjugated five-membered ring ligand. A preferred transition metal compound is a compound represented by the following general formulae (1) to (4).

[Chem 1]

(1)

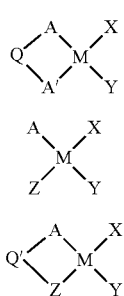

In the general formula (1) to (4), A and A' each independently represent a conjugated five-membered ring ligand which may have substituent(s). Q represents a bonding group that crosslinks two conjugated five-membered ring ligands at any position. Z represents a hydrogen atom, a halogen atom, a hydrocarbon group, or a ligand containing a nitrogen atom, an oxygen atom, a silicon atom, a phosphorus atom or a sulfur atom. Q' represents a bonding group that crosslinks any position of the conjugated five-membered ring ligand and Z. M represents a metal atom selected from Group 4 of the Periodic Table. X and Y each independently represent a hydrogen atom, a halogen atom, a hydrocarbon group, an alkoxy group, an amino group, a phosphorus-containing hydrocarbon group, or a silicon-containing hydrocarbon group.

Examples of A and A' include a cyclopentadienyl group. The cyclopentadienyl group may be a group [$C_5H_5$—] having five hydrogen atoms, or a derivative thereof, that is, a group in which some of the hydrogen atoms are substituted with substituent(s).

An example of the substituent is a hydrocarbon group having 1 to 40 carbon atoms, preferably 1 to 30 carbon atoms. The hydrocarbon group may be bonded to a cyclopentadienyl group as a monovalent group, or when a plurality of hydrocarbon groups are present, two of the hydrocarbon groups may be bonded to each other at the other end (co-end) to form a ring together with a part of cyclopentadienyl. Examples of the latter include a group obtained by forming a condensed six-membered ring where two substituents are bonded to each other at the co-end and share two adjacent carbon atoms in the cyclopentadienyl group, that is, an indenyl group, a tetrahydroindenyl group and a fluorenyl group, and a group obtained by forming a condensed seven-membered ring, that is, an azulenyl group and a tetrahydroazulenyl group.

Preferred specific examples of the conjugated five-membered ring ligand represented by A and A' include a substituted or unsubstituted cyclopentadienyl group, indenyl group, fluorenyl group, azulenyl group, each of which may be a substituted or unsubstituted. Among these, a substituted or unsubstituted indenyl group or substituted or unsubstituted azulenyl group is particularly preferable.

Examples of the substituent on the cyclopentadienyl group include, in addition to the hydrocarbon group having 1 to 40 carbon atoms, preferably 1 to 30 carbon atoms, a halogen atom such as fluorine, chlorine, or bromine, an alkoxy group having 1 to 12 carbon atoms, for example, a silicon-containing hydrocarbon group represented by —Si($R^1$)($R^2$)($R^3$), a phosphorus-containing hydrocarbon group represented by —P($R^1$)($R^2$), or a boron-containing hydrocarbon group represented by —B($R^1$)($R^2$). When there are a plurality of these substituents, the respective substituents may be the same as or different from each other. $R^1$, $R^2$, and $R^3$ may be the same as or different from each other, and each represent an alkyl group having 1 to 24 carbon atoms, preferably 1 to 18 carbon atoms.

Furthermore, as the substituent on the cyclopentadienyl group, at least one Group 15 to Group 16 element (that is, a hetero element) may be included. In this case, a metallocene compound in which the number of atoms bonding a Group 15 to Group 16 element and the conjugated five-membered ring ligand is 1 or less is more preferable from the viewpoint of improving the properties of the active site by allowing the hetero element itself to be present in the vicinity of the active site without being bonded or coordinated with a metal.

A position of the Group 15 to Group 16 element on the ligand is not particularly limited, but is preferably on the substituent at a 2-position. More preferably, the substituent at the 2-position is a monocyclic or polycyclic ring containing a heteroatom selected from the group consisting of an oxygen atom, a sulfur atom, a nitrogen atom, and a phosphorus atom in a 5-membered ring or a 6-membered ring. Preferred is a heteroaromatic group having 4 to 20 carbon atoms which may contain silicon or halogen, the heteroaromatic group preferably has a 5-membered ring structure, and the heteroatom is preferably an oxygen atom, a sulfur atom, or a nitrogen atom, more preferably an oxygen atom or a sulfur atom, and still more preferably an oxygen atom.

Q represents a bonding group that crosslinks two conjugate five-membered ring ligands at any position, and Q' represents a bonding group that crosslinks a group represented by Z and any position of the conjugated five-membered ring ligand.

Specific examples of Q and Q' include the following groups.

(a) Alkylene groups such as a methylene group, an ethylene group, an isopropylene group, a phenylmethylmethylene group, a diphenylmethylene group, and a cyclohexylene group (b) Silylene groups such as dimethylsilylene group, diethylsilylene group, dipropylsilylene group, diphenylsilylene group, methylethylsilylene group, methylphenylsilylene group, methyl-t-butylsilylene group, disilylene group, and tetramethyldisilylene group (c) Hydrocarbon groups containing germanium, phosphorus, nitrogen, boron, or aluminum Specific examples thereof include groups represented by ($CH_3$)$_2$Ge, ($C_6H_5$)$_2$Ge, ($CH_3$)P, ($C_6H_5$)P, ($C_4H_9$)N, ($C_6H_5$)N, ($C_4H_9$)B, ($C_6H_5$)B, ($C_6H_5$)Al, and ($C_6H_5$O)Al. Preferred are alkylene groups and silylene groups.

In Q and Q', the substituents bonded to Q and Q' may be linked to each other to form a new ring structure. Specific examples thereof include the following groups.

Cycloalkylene groups such as a cyclobutylene group and a cyclopentylene group, and silacycloalkylene groups such as a silacyclobutylene group and a silacyclopentylene group M is a metal atom, particularly a transition metal atom selected from Group 4 of the Periodic Table, and is, for example, titanium, zirconium, hafnium, or the like. In particular, zirconium and hafnium are preferable.

Z represents a hydrogen atom, a halogen atom, a hydrocarbon group, or a ligand containing a nitrogen atom, an oxygen atom, a silicon atom, a phosphorus atom or a sulfur atom. Preferred specific examples thereof include an oxygen atom, a sulfur atom, a thioalkoxy group having 1 to 20 carbon atoms, and more preferably 1 to 12 carbon atoms, a silicon-containing hydrocarbon group having 1 to 40 carbon atoms, and more preferably 1 to 18 carbon atoms, a nitrogen-containing hydrocarbon group having 1 to 40 carbon atoms, and more preferably 1 to 18 carbon atoms, a phosphorus-containing hydrocarbon group having 1 to 40 carbon atoms, and more preferably 1 to 18 carbon atoms, a hydrogen atom, a chlorine atom, a bromine atom, and a hydrocarbon group having 1 to 20 carbon atoms.

X and Y each represent a hydrogen atom, a halogen atom, a hydrocarbon group, an alkoxy group, an amino group, a phosphorus-containing hydrocarbon group, or a silicon-containing hydrocarbon group. The hydrocarbon group preferably has 1 to 20 carbon atoms, and more preferably 1 to 10 carbon atoms. The alkoxy group preferably has 1 to 20 carbon atoms, and more preferably 1 to 10 carbon atoms. The phosphorus-containing hydrocarbon group is preferably a diphenylphosphino group or the like, and preferably has 1 to 20 carbon atoms, and more preferably 1 to 12 carbon atoms. The silicon-containing hydrocarbon group is preferably a trimethylsilyl group, a bis(trimethylsilyl)methyl group, or the like, and preferably has 1 to 20 carbon atoms, more preferably 1 to 12 carbon atoms.

X and Y may be the same as or different from each other. Among these, a halogen atom, a hydrocarbon group having 1 to 10 carbon atoms, and an amino group having 1 to 12 carbon atoms are particularly preferable.

Examples of the compound represented by the general formula (1) include:
(1) bis(methylcyclopentadienyl)zirconium dichloride,
(2) bis(n-butylcyclopentadienyl)zirconium dichloride,
(3) bis(1,3-dimethylcyclopentadienyl)zirconium dichloride,
(4) bis(1-n-butyl-3-methylcyclopentadienyl)zirconium dichloride,
(5) bis(1-methyl-3-trifluoromethylcyclopentadienyl)zirconium dichloride,
(6) bis(1-methyl-3-trimethylsilylcyclopentadienyl)zirconium dichloride,
(7) bis(1-methyl-3-phenylcyclopentadienyl)zirconium dichloride,
(8) bis(indenyl)zirconium dichloride,
(9) bis(tetrahydroindenyl)zirconium dichloride, and
(10) bis(2-methyl-tetrahydroindenyl)zirconium dichloride.

Examples of the compound represented by the general formula (2) include:
(1) dimethylsilylenebis{1-(2-methyl-4-isopropyl-4H-azulenyl)}zirconium dichloride,
(2) dimethylsilylenebis{1-(2-methyl-4-phenyl-4H-azulenyl)} zirconium dichloride,
(3) dimethylsilylenebis[1-{2-methyl-4-(4-fluorophenyl)-4H-azulenyl}]zirconium dichloride,
(4) dimethylsilylenebis[1-{2-methyl-4-(2,6-dimethylphenyl)-4H-azulenyl}]zirconium dichloride,
(5) dimethylsilylenebis{1-(2-methyl-4,6-diisopropyl-4H-azulenyl)}zirconium dichloride,
(6) diphenylsilylenebis{1-(2-methyl-4-phenyl-4H-azulenyl)} zirconium dichloride,
(7) dimethylsilylenebis{1-(2-ethyl-4-phenyl-4H-azulenyl)}zirconium dichloride,
(8) ethylenebis{1-[2-methyl-4-(4-biphenylyl)-4H-azulenyl]} zirconium dichloride,
(9) dimethylsilylenebis{1-[2-ethyl-4-(2-fluoro-4-biphenylyl)-4H-azulenyl]}zirconium dichloride,
(10) dimethylsilylenebis{1-[2-methyl-4-(2',6'-dimethyl-4-biphenylyl)-4H-azurenyl]}zirconium dichloride,
(11) dimethylsilylene{1-[2-methyl-4-(4-biphenylyl)-4H-azulenyl]}{1-[2-methyl-4-(4-biphenylyl)indenyl]}zirconium dichloride,
(12) dimethylsilylene{1-(2-ethyl-4-phenyl-4H-azulenyl)}{1-(2-methyl-4,5-benzoindenyl)}zirconium dichloride,
(13) dimethylsilylenebis{1-(2-ethyl-4-phenyl-7-fluoro-4H-azulenyl)}zirconium dichloride,
(14) dimethylsilylenebis{1-(2-ethyl-4-indolyl-4H-azulenyl)} zirconium dichloride,
(15) dimethylsilylenebis[1-{2-ethyl-4-(3,5-bistrifluoromethylphenyl)-4H-azulenyl}]zirconium dichloride,
(16) dimethylsilylenebis{1-(2-methyl-4-phenyl-4H-azulenyl)}zirconiumbis(trifluoromethanesulfonic acid),
(17) dimethylsilylenebis{1-(2-methyl-4-phenylindenyl)} zirconium dichloride,
(18) dimethylsilylenebis{1-(2-methyl-4,5-benzoindenyl)} zirconium dichloride,
(19) dimethylsilylenebis[1-{2-methyl-4-(1-naphthyl) indenyl}]zirconium dichloride,
(20) dimethylsilylenebis{1-(2-methyl-4,6-diisopropylindenyl)}zirconium dichloride,
(21) dimethylsilylenebis{1-(2-ethyl-4-phenylindenyl)}zirconium dichloride,
(22) ethylene-1,2-bis{1-(2-methyl-4-phenylindenyl)}zirconium dichloride,
(23) ethylene-1,2-bis{1-(2-ethyl-4-phenylindenyl)}zirconium dichloride,
(24) isopropylidenebis{1-(2-methyl-4-phenylindenyl)}zirconium dichloride,
(25) ethylene-1,2-bis{1-(2-methyl-4-phenyl-4H-azulenyl)} zirconium dichloride,
(26) isopropylidenebis{1-(2-methyl-4-phenyl-4H-azulenyl)} zirconium dichloride,
(27) dimethylgermylenebis{1-(2-methyl-4-phenylindenyl)} zirconium dichloride,
(28) dimethylgermylenebis{1-(2-ethyl-4-phenylindenyl)} zirconium dichloride,
(29) phenylphosphinobis{1-(2-ethyl-4-phenylindenyl)}zirconium dichloride,
(30) dimethylsilylenebis[3-(2-furyl)-2,5-dimethyl-cyclopentadienyl]zirconium dichloride,
(31) dimethylsilylenebis[2-(2-furyl)-3,5-dimethyl-cyclopentadienyl]zirconium dichloride,
(32) dimethylsilylenebis[2-(2-furyl)indenyl]zirconium dichloride,
(33) dimethylsilylenebis[2-(2-(5-methyl)furyl)-4,5-dimethyl-cyclopentadienyl]zirconium dichloride,
(34) dimethylsilylenebis[2-(2-(5-trimethylsilyl)furyl)-4,5-dimethyl-cyclopentadienyl]zirconium dichloride,
(35) dimethylsilylenebis[2-(2-thienyl)indenyl]zirconium dichloride,
(36) dimethylsilylene[2-(2-(5-methyl)furyl)-4-phenylindenyl][2-methyl-4-phenylindenyl]zirconium dichloride,
(37) dimethylsilylenebis(2,3,5-trimethylcyclopentadienyl) zirconium dichloride,
(38) dimethylsilylenebis(2,3-dimethyl-5-ethylcyclopentadienyl)zirconium dichloride,
(39) dimethylsilylenebis(2,5-dimethyl-3-phenylcyclopentadienyl)zirconium dichloride,
(40) dichlorosilacyclobutylenebis[2-(2-furyl)-4-phenyl-5-methyl-1-indenyl]zirconium,
(41) dichlorosilacyclobutylene bis[2-(5-methyl-2-furyl)-4-phenyl-5-methyl-1-indenyl]zirconium,
(42) dichlorosilacyclobutylenebis[2-(4,5-dimethyl-2-furyl)-4-phenyl-5-methyl-1-indenyl]zirconium,
(43) dichlorosilacyclobutylenebis[2-(5-t-butyl-2-furyl)-4-phenyl-5-methyl-1-indenyl]zirconium,
(44) dichlorosilacyclobutylenebis[2-(5-phenyl-2-furyl)-4-phenyl-5-methyl-1-indenyl]zirconium,
(45) dichlorosilacyclobutylenebis[2-(2-thienyl)-4-phenyl-5-methyl-1-indenyl]zirconium,

(46) dichlorosilacyclobutylenebis[2-(5-methyl-2-thienyl)-4-phenyl-5-methyl-1-indenyl]zirconium,
(47) dichlorosilacyclobutylenebis[2-(5-methyl-2-furyl)-4-(4-fluorophenyl)-5-methyl-1-indenyl]zirconium,
(48) dichlorosilacyclobutylenebis[2-(5-methyl-2-furyl)-4-(4-chlorophenyl)-5-methyl-1-indenyl]zirconium,
(49) dichlorosilacyclobutylenebis[2-(5-methyl-2-furyl)-4-(4-methylphenyl)-5-methyl-1-indenyl]zirconium,
(50) dichlorosilacyclobutylenebis[2-(5-methyl-2-furyl)-4-(4-t-butylphenyl)-5-methyl-1-indenyl]zirconium,
(51) dichlorosilacyclobutylenebis[2-(5-methyl-2-furyl)-4-(3,5-dimethylphenyl)-5-methyl-1-indenyl]zirconium,
(52) dichlorosilacyclobutylenebis[2-(5-methyl-2-furyl)-4-(3,5-di-t-butylphenyl)-5-methyl-1-indenyl]zirconium,
(53) dichlorosilacyclobutylenebis[2-(5-methyl-2-furyl)-4-(1-naphthyl)-5-methyl-1-indenyl]zirconium,
(54) dichlorosilacyclobutylenebis[2-(5-methyl-2-furyl)-4-(2-naphthyl)-5-methyl-1-indenyl]zirconium,
(55) dichlorosilacyclobutylenebis[2-(5-methyl-2-furyl)-4-(4-biphenylyl)-5-methyl-1-indenyl]zirconium,
(56) dichlorosilacyclobutylenebis[2-(2-furyl)-4-phenyl-5,6-dimethyl-1-indenyl]zirconium,
(57) dichlorosilacyclobutylenebis[2-(5-methyl-2-furyl)-4-phenyl-5,6-dimethyl-1-indenyl]zirconium,
(58) dichlorosilacyclobutylenebis[2-(4,5-dimethyl-2-furyl)-4-phenyl-5,6-dimethyl-1-indenyl]zirconium,
(59) dichlorosilacyclobutylenebis[2-(5-t-butyl-2-furyl)-4-phenyl-5,6-dimethyl-1-indenyl]zirconium,
(60) dichlorosilacyclobutylenebis[2-(5-phenyl-2-furyl)-4-phenyl-5,6-dimethyl-1-indenyl]zirconium,
(61) dichlorosilacyclobutylenebis[2-(2-thienyl)-4-phenyl-5,6-dimethyl-1-indenyl]zirconium,
(62) dichlorosilacyclobutylenebis[2-(5-methyl-2-thienyl)-4-phenyl-5,6-dimethyl-1-indenyl]zirconium,
(63) dichlorosilacyclobutylenebis[2-(5-methyl-2-furyl)-4-(4-fluorophenyl)-5,6-dimethyl-1-indenyl]zirconium,
(64) dichlorosilacyclobutylenebis[2-(5-methyl-2-furyl)-4-(4-chlorophenyl)-5,6-dimethyl-1-indenyl]zirconium,
(65) dichlorosilacyclobutylenebis[2-(5-methyl-2-furyl)-4-(4-methylphenyl)-5,6-dimethyl-1-indenyl]zirconium,
(66) dichlorosilacyclobutylenebis[2-(5-methyl-2-furyl)-4-(4-t-butylphenyl)-5,6-dimethyl-1-indenyl]zirconium,
(67) dichlorosilacyclobutylenebis[2-(5-methyl-2-furyl)-4-(3,5-dimethylphenyl)-5,6-dimethyl-1-indenyl]zirconium,
(68) dichlorosilacyclobutylenebis[2-(5-methyl-2-furyl)-4-(3,5-di-t-butylphenyl)-5,6-dimethyl-1-indenyl]zirconium,
(69) dichlorosilacyclobutylenebis[2-(5-methyl-2-furyl)-4-(1-naphthyl)-5,6-dimethyl-1-indenyl]zirconium,
(70) dichlorosilacyclobutylenebis[2-(5-methyl-2-furyl)-4-(2-naphthyl)-5,6-dimethyl-1-indenyl]zirconium,
(71) dichlorosilacyclobutylenebis[2-(5-methyl-2-furyl)-4-(4-biphenylyl)-5,6-dimethyl-1-indenyl]zirconium,
(72) dichlorosilacyclobutylenebis[2-(2-furyl)-4-phenyl-1,5,6,7-tetrahydro-s-indacen-1-yl]zirconium,
(73) dichlorosilacyclobutylenebis[2-(5-methyl-2-furyl)-4-phenyl-1,5,6,7-tetrahydro-s-indacen-1-yl]zirconium,
(74) dichlorosilacyclobutylenebis[2-(4,5-dimethyl-2-furyl)-4-phenyl-1,5,6,7-tetrahydro-s-indacen-1-yl]zirconium,
(75) dichlorosilacyclobutylenebis[2-(5-t-butyl-2-furyl)-4-phenyl-1,5,6,7-tetrahydro-s-indacen-1-yl]zirconium,
(76) dichlorosilacyclobutylenebis[2-(5-phenyl-2-furyl)-4-phenyl-1,5,6,7-tetrahydro-s-indacen-1-yl]zirconium,
(77) dichlorosilacyclobutylenebis[2-(2-thienyl)-4-phenyl-1,5,6,7-tetrahydro-s-indacen-1-yl]zirconium,
(78) dichlorosilacyclobutylenebis[2-(5-methyl-2-thienyl)-4-phenyl-1,5,6,7-tetrahydro-s-indacen-1-yl]zirconium,
(79) dichlorosilacyclobutylenebis[2-(5-methyl-2-furyl)-4-(4-fluorophenyl)-1,5,6,7-tetrahydro-s-indacen-1-yl]zirconium,
(80) dichlorosilacyclobutylenebis[2-(5-methyl-2-furyl)-4-(4-chlorophenyl)-1,5,6,7-tetrahydro-s-indacen-1-yl]zirconium,
(81) dichlorosilacyclobutylenebis[2-(5-methyl-2-furyl)-4-(4-methylphenyl)-1,5,6,7-tetrahydro-s-indacen-1-yl]zirconium,
(82) dichlorosilacyclobutylenebis[2-(5-methyl-2-furyl)-4-(4-t-butylphenyl)-1,5,6,7-tetrahydro-s-indacen-1-yl]zirconium,
(83) dichlorosilacyclobutylenebis[2-(5-methyl-2-furyl)-4-(3,5-dimethylphenyl)-1,5,6,7-tetrahydro-s-indacen-1-yl]zirconium,
(84) dichlorosilacyclobutylenebis[2-(5-methyl-2-furyl)-4-(3,5-di-t-butylphenyl)-1,5,6,7-tetrahydro-s-indacen-1-yl]zirconium,
(85) dichlorosilacyclobutylenebis[2-(5-methyl-2-furyl)-4-(1-naphthyl)-1,5,6,7-tetrahydro-s-indacen-1-yl]zirconium,
(86) dichlorosilacyclobutylenebis[2-(5-methyl-2-furyl)-4-(2-naphthyl)-1,5,6,7-tetrahydro-s-indacen-1-yl]zirconium,
(87) dichlorosilacyclobutylenebis[2-(5-methyl-2-furyl)-4-(4-biphenylyl)-1,5,6,7-tetrahydro-s-indacen-1-yl]zirconium,
(88) dichlorosilacyclobutylenebis[2-(2-furyl)-4-phenyl-1,5,6,7-tetrahydro-5,5,7,7-tetramethyl-s-indacen-1-yl]zirconium,
(89) dichlorosilacyclobutylenebis[2-(5-methyl-2-furyl)-4-phenyl-1,5,6,7-tetrahydro-5,5,7,7-tetramethyl-s-indacen-1-yl]zirconium,
(90) dichlorosilacyclobutylene[2-(5-methyl-2-furyl)-4-phenyl-5-methyl-1-indenyl][2,5-dimethyl-4-phenyl-1-indenyl]zirconium,
(91) dichlorosilacyclobutylene[2-(5-methyl-2-furyl)-4-phenyl-5-methyl-1-indenyl][2-(2-furyl)-4-phenyl-5-methyl-1-indenyl]zirconium,
(92) dichlorosilacyclobutylene[2-(5-methyl-2-furyl)-4-phenyl-5-methyl-1-indenyl][2-(5-t-butyl-2-furyl)-4-phenyl-5-methyl-1-indenyl]zirconium,
(93) dichlorosilacyclobutylene[2-(5-methyl-2-furyl)-4-phenyl-5-methyl-1-indenyl] [2-(5-methyl-2-furyl)-4-phenyl-1-indenyl]zirconium,
(94) dichlorosilacyclobutylene[2-(5-methyl-2-furyl)-4-phenyl-5-methyl-1-indenyl][2-(5-methyl-2-furyl)-4-phenyl-5,6-dimethyl-1-indenyl]zirconium,
(95) dichlorosilacyclobutylene[2-(5-methyl-2-furyl)-4-phenyl-5-methyl-1-indenyl][2-(5-methyl-2-furyl)-4-phenyl-1,5,6,7-tetrahydro-s-indacen-1-yl]zirconium,
(96) dichlorosilcyclopentylenebis[2-(2-furyl)-4-phenyl-5-methyl-1-indenyl]zirconium,
(97) dichlorosillacyclopentylenebis[2-(5-methyl-2-furyl)-4-phenyl-5-methyl-1-indenyl]zirconium,
(98) dichlorosillacyclopentylenebis[2-(2-furyl)-4-phenyl-1,5,6,7-tetrahydro-s-indacen-1-yl]zirconium, and
(99) dichlorosillacyclopentylenebis[2-(5-methyl-2-furyl)-4-phenyl-1,5,6,7-tetrahydro-s-indacen-1-yl] irconium.

Examples of the compound represented by the general formula (3) include:
(1) (tetramethylcyclopentadienyl)titanium(bis t-butylamide)dichloride,
(2) (tetramethylcyclopentadienyl)titanium(bisisopropylamide)dichloride,
(3) (tetramethylcyclopentadienyl)titanium(biscyclododecylamide)dichloride, (4) (tetramethylcyclopentadienyl)titanium {bis(trimethylsilyl)amide}dichloride,
(5) (2-methyl-4-phenyl-4H-azulenyl)titanium {bis(trimethylsilyl)amide}dichloride,
(6) (2-methylindenyl)titanium(bis t-butylamide)dichloride,
(7) (fluorenyl)titanium(bis(t-butylamide)dichloride,
(8) (3,6-diisopropylfluorenyl)titanium(bis t-butylamide)dichloride,
(9) (tetramethylcyclopentadienyl)titanium(phenoxide)dichloride, and
(10) (tetramethylcyclopentadienyl)titanium(2,6-diisopropylphenoxide)dichloride.

Examples of the compound represented by the general formula (4) include:
(1) dimethylsilanediyl(tetramethylcyclopentadienyl)(t-butylamide)fitanium dichloride,
(2) dimethylsilanediyl(tetramethylcyclopentadienyl)(cyclododecylamide)fitanium dichloride,
(3) dimethylsilanediyl(2-methylindenyl)(t-butylamide)titanium dichloride, and
(4) dimethylsilanediyl(fluorenyl)(t-butylamide)titanium dichloride.

A compound in which dichloride of these exemplified compounds is substituted by dibromide, difluoride, dimethyl, diphenyl, dibenzyl, bisdimethylamide, bisdiethylamide, or the like is also exemplified in the same manner. Further, a compound in which zirconium of the exemplified compound is substituted with hafnium or titanium, and titanium of the exemplified compound is substituted with hafnium or zirconium is also exemplified in the same manner.

As the transition metal compound used in the present embodiment, a compound represented by the general formula (2) is preferable, and a compound having a group obtained by forming a condensed seven-membered ring in a substituent, that is, an azulenyl group or a tetrahydroazulenyl group is particularly preferable.

The metallocene compound may be used alone or in combination of two or more thereof.

When two or more kinds are used in combination, two or more kinds can be selected from the group of compounds contained in any one of the general formulae (1) to (4), and one or two or more kinds selected from the group of compounds contained in one general formula and one or two or more kinds selected from the group of compounds contained in another general formula can also be selected.

For example, the metallocene compound is a metallocene compound that forms a catalyst for polymerization for producing an olefin macromer and the metallocene compound that forms a catalyst for polymerization for producing an olefin macromer may be a combination of a metallocene compound (II-1) that forms a propylene homopolymer having a terminal vinyl ratio of 0.5 or more when propylene homopolymerization is performed at 70° C. and a metallocene compound (II-2) represented by the general formula (4). A molar ratio (II-1)/(II-2) of the component (II-1) to the component (II-2) can be 1.0 to 99.0.

(2) Component (III): Organoaluminum Compound

The component (III) is an organoaluminum compound.

As the organoaluminum compound used as the component (III) in the present embodiment, an organoaluminum compound represented by the general formula: $(AlR_nX_{3-n})_m$ is used.

In the formula, R represents an alkyl group having 1 to 20 carbon atoms; X represents a halogen atom, a hydrogen atom, an alkoxy group, or an amino group; n represents an integer of 1 to 3; and m represents 1 or 2.

The organoaluminum compound may be used alone or in combination of two or more thereof.

Specific examples of the organoaluminum compound include trimethylaluminum, triethylaluminum, trinormalpropylaluminum, trinormalbutylaluminum, triisobutylaluminum, trinormalhexylaluminum, trinormaloctylaluminum, trinormaldecylaluminum, diethylaluminum chloride, diethylaluminum sesquichloride, diethylaluminum hydride, diethylaluminum ethoxide, diethylaluminum dimethylamide, diisobutylaluminum hydride, and diisobutylaluminum chloride.

Among these, trialkyl aluminum and alkyl aluminum hydride where m=1 and n=3 are preferable. More preferably, trialkyl aluminum where R has 1 to 8 carbon atoms is used.

(3) Method for Producing Catalyst for Olefin Polymerization: Contact of α-olefin Having 2 to 20 Carbon Atoms (Pre-Polymerization)

A catalyst for olefin polymerization obtained by bringing the component (I), the component (II), and, if necessary, the component (III) into contact with each other is preferably subjected to a pre-polymerization treatment including a small amount of polymerization by further contacting an α-olefin having 2 to 20 carbon atoms, if necessary.

The α-olefin having 2 to 20 carbon atoms to be used is not particularly limited, but ethylene, propylene, 1-butene, 1-hexene, 1-octene, 4-methyl-1-pentene, 3-methyl-1-butene, vinylcycloalkane, styrene, and the like can be used, and propylene is particularly preferably used.

As a method of supplying the α-olefin at the time of the pre-polymerization, any method such as a supply method of maintaining the α-olefin in a reaction tank at a constant speed or at a constant pressure or a combination thereof, or performing a stepwise change thereof can be used.

A pre-polymerization time is not particularly limited, but is preferably in a range of 5 minutes to 24 hours. As for an amount of pre-polymerization, an amount of a pre-polymerized polymer is preferably 0.01 g to 100 g, more preferably 0.1 g or more, and still more preferably 50 g or less, per 1 g of the component (I).

A pre-polymerization temperature is not particularly limited, but is preferably 0° C. to 100° C., more preferably 10° C. or higher, even more preferably 20° C. or higher, and particularly preferably 30° C. or higher, and is more preferably 70° C. or lower, even more preferably 60° C. or lower, and particularly preferably 50° C. or lower. When the pre-polymerization temperature is below the range, there is a possibility to cause a harmful influence that a reaction rate is decreased or an activation reaction does not proceed. On the other hand, when the pre-polymerization temperature is higher than the above range, there is a possibility to cause a harmful influence that the pre-polymerized polymer is dissolved, a pre-polymerization rate is too high to deteriorate the particle properties, and the active sites are deactivated due to side reactions.

The pre-polymerization can also be performed in a liquid such as an organic solvent, which is preferred. A concentration of the catalyst during pre-polymerization is not particularly limited, but is preferably 10 g/L or more, more preferably 20 g/L or more, and particularly preferably 30 g/L or more. The higher the concentration is, the more activation of the metallocene compound proceeds and the catalyst becomes a highly active catalyst, which is preferable, but an upper limit thereof is usually 80 g/L or less.

Furthermore, at the time of or after the contact of the above components, a polymer such as polyethylene, polypropylene, or polystyrene, or an inorganic oxide solid such as silica or titania may coexist.

The catalyst after the pre-polymerization may be used as it is or may be dried. A drying method is not particularly limited, and examples thereof include drying under reduced pressure, drying by heating, and drying by circulating a dry gas, and these methods may be used alone, or two or more methods may be used in combination. In a drying step, the catalyst may be stirred, vibrated, or caused to flow, or may be allowed to stand.

(4) Contact Method in Method for Producing Catalyst for Olefin Polymerization

In the method for producing a catalyst for olefin polymerization, the component (I) is brought into contact with the component (II) and, if necessary, the component (III), and then the resultant is further brought into contact with an α-olefin having 2 to 20 carbon atoms, thereby obtaining a catalyst for olefin polymerization.

A contact method of the component (I), the component (II), and the component (III) is not particularly limited, but the components can be brought into contact in the following order. This contact may be performed in the absence of an olefin shown as the α-olefin or in the presence thereof. In the contact, a solvent may be used in order to sufficiently perform the contact. Examples of the solvent include aliphatic saturated hydrocarbons, aromatic hydrocarbons, aliphatic unsaturated hydrocarbons, halides thereof, and pre-polymerization monomers.

(i) The component (I) and the component (II) are brought into contact with each other.

(ii) After the component (I) and the component (II) are brought into contact with each other, the resultant is brought into contact with the component (III).

(iii) After the component (I) and the component (III) are brought into contact with each other, the resultant is brought into contact with the component (II).

(iv) After the component (II) and the component (III) are brought into contact with each other, the resultant is brought into contact with the component (I).

(v) The three components are simultaneously brought into contact.

A preferred contact method is a method in which after the component (I) and the component (III) are brought into contact with each other, the unreacted component (III) is removed by washing or the like, then the minimum necessary component (III) is brought into contact with the component (I) again, and then the resultant is brought into contact with the component (II). In this case, a molar ratio of Al/transition metal is not particularly limited, but is preferably in a range of 0.1 to 1000, more preferably 2 or more, and even more preferably 4 or more, and is more preferably 100 or less, and even more preferably 50 or less.

A temperature at which the component (I) and the component (III) are brought into contact with each other is not particularly limited, but is preferably 0° C. to 100° C., more preferably 20° C. or more, and still more preferably 30° C. or more, and is more preferably 80° C. or less, and still more preferably 60° C. or less. In this range, a sufficient reaction rate is obtained, and a side reaction is prevented. In this case, the component (II) may be present.

When the component (II) and the component (III) are brought into contact with each other, an organic solvent is preferably present as a solvent. In this case, a concentration of the component (II) in the organic solvent is preferably high. A lower limit of the concentration of the component (II) in the organic solvent is preferably 3 mmol/L, more preferably 4 mmol/L, and still more preferably 6 mmol/L. When the concentration of the component (II) is the lower limit or more, a desired reaction rate can be ensured, and the reaction proceeds sufficiently. In this case, the component (I) may be present.

An amount of the component (II) per 1 g of the component (I) is preferably in a range of 0.001 mmol to 10 mmol, and more preferably in a range of 0.001 mmol to 1 mmol.

3. Method for Producing Olefin (Co)Polymer

A method for producing an olefin (co)polymer is characterized by homopolymerizing or copolymerizing an α-olefin having 2 to 20 carbon atoms in the presence of the catalyst for olefin polymerization. That is, in the production method, one kind of α-olefin is polymerized, or two or more kinds of α-olefins are copolymerized. In the present specification, the (co)polymer means at least one of a homopolymer and a copolymer.

In the case of copolymerization, an amount ratio of each monomer in the reaction system does not need to be constant over time, and each monomer can be also supplied at a constant mixing ratio. In addition, it is also possible to change the mixing ratio of the supplied monomers over time. Any of the monomers may be added in a divided manner in consideration of a copolymerization reaction ratio.

The α-olefin that can be polymerized preferably has 2 to 20 carbon atoms, and specific examples thereof include ethylene, propylene, 1-butene, 1-pentene, 1-hexene, 1-octene, styrene, divinylbenzene, 7-methyl-1, 7-octadiene, cyclopentene, norbornene, and ethylidene norbornene. The α-olefin having 2 to 8 carbon atoms is preferable, and ethylene and propylene are more preferable.

In the case of copolymerization, as the kind of comonomer to be used, one kind or two or more kinds of α-olefins other than one serving as a main component can be selected and used among the above-mentioned α-olefins. A preferred main component of the comonomer is propylene.

Any mode can be adopted as a polymerization mode as long as the catalyst and the monomer are efficiently brought into contact with each other. Specifically, a slurry method using an inert solvent, a method using propylene as a solvent without substantially using an inert solvent, a solution polymerization method, a gas phase method of maintaining a monomer in a gaseous state without substantially using a liquid solvent, or the like can be adopted. A method of performing continuous polymerization or batch polymerization is also applied. In the case of slurry polymerization, as a polymerization solvent, saturated aliphatic or aromatic hydrocarbons such as hexane, heptane, pentane, cyclohexane, benzene, and toluene may be used alone or in combination. A polymerization temperature is preferably 0 to 150° C., for example. Hydrogen can be supplementarily used as a molecular weight modifier. A polymerization pressure is, for example, 0 to 2000 kg/cm$^2$G, and preferably 0 to 60 kg/cm$^2$G.

The olefin (co)polymer obtained by the method for producing an olefin (co)polymer is not particularly limited, and preferable examples thereof include an ethylene homopolymer, a propylene homopolymer, a propylene-ethylene block copolymer, a propylene-ethylene random copolymer, and a propylene/ethylene-α-olefin copolymer.

EXAMPLES

Next, the present invention will be specifically described with reference to Examples, but the present invention is not limited to these Examples.

The analytical instruments and the measurement methods used for the measurement of physical properties are as follows.

1. VARIOUS PHYSICAL PROPERTIES MEASURING METHODS (1) Composition Analysis of Ion-Exchangeable Layered Silicate:

A calibration curve was prepared by chemical analysis according to a JIS method, and quantification by fluorescent X-ray measurement was performed.

As a device, ZSX-100e manufactured by Rigaku Corporation was used. A sample was calcined at 700° C. for 1 hour, then 0.5 g of the sample was divided, and mixed with 4.5 g of a fluxing agent ($Li_2B_4O_7$) and 0.03 g of a release agent (KBr) to prepare a glass bead.

A calibration curve range for each atom is as follows.

Si: 19.8% to 44.22%, Al: 2.01% to 19.4%, Mg: 0.22% to 3.02%, Na: 0.21% to 3.62%, Fe: 0.53% to 5.83%

Ca and K were determined by ICP emission spectroscopy. Sulfuric acid and hydrofluoric acid were added to the sample calcined at 700° C. for 1 hour, and the mixture was heated and dissolved, and then the solution thereof was measured by ICP-OES (ULTIMA2 type, manufactured by Horiba, Ltd.).

(2) Pore Distribution Measurement and Specific Surface Area Measurement:

A pore distribution and a specific surface area were measured by a nitrogen adsorption method. An adsorption isotherm was measured under a liquid nitrogen temperature. BET multipoint analysis was performed using the obtained adsorption isotherm to determine the specific surface area.

Device: Autosorb 3B manufactured by Quantachrome Corporation

Measurement method: nitrogen gas adsorption method

Pretreatment conditions: sample was heated under reduced pressure at 200° C. under vacuum (1.3 MPa or less) for 2 hours Sample amount: about 0.2 g Gas liquefaction temperature: 77K (3) Measurement of Particle Diameter and Particle Size Distribution:

(3-1) Measurement of Granulated Product

Measurement was performed using a laser diffraction and scattering particle size distribution measuring device LA-920 manufactured by Horiba, Ltd., under the conditions of ethanol as a dispersion solvent, a refractive index of 1.3, and a shape factor of 1.0. The particle diameter refers to a median diameter.

(3-2) Measurement of Average Particle Diameter and Particle Size Distribution of Ion-Exchangeable First Layered Silicate (A) or Ion-Exchangeable Second Layered Silicate (B)

0.05 g of an ion-exchangeable layered silicate was weighed and slowly added to 9.95 g of distilled water with stirring with a stirrer to prepare a uniform 0.5% by weight aqueous slurry, which was allowed to stand overnight (12 hours or more). The aqueous slurry was subjected to an ultrasonic treatment for 10 minutes, and measurement was performed using a laser diffraction/scattering particle size measuring device (laser diffraction/scattering particle size measuring device LA-920, manufactured by Horiba, Ltd.) under the conditions of water as a dispersion medium, a refractive index of 1.3, and a shape factor of 1.0. The particle diameter refers to a median diameter. The particle size distribution for determining a Rosin-Rammler distribution constant was also measured at the same time.

(4) MFR (Melt Mass Flow Rate): The Measurement was Performed Using a Melt Indexer Manufactured by Takara in Accordance with JIS K7210: 1999, Test Conditions of "Plastic-Determination of Melt Mass Flow Rate (MFR) and Melt Volume Flow Rate (MVR) of Thermoplastic Plastics": 230° C., 2.16 kg Load.

(5) X-Ray Diffraction:

X-ray diffraction measurement was performed under the following conditions.

Device: X-ray diffractometer smartlab manufactured by Rigaku Corporation

X-ray source: Cu—Kα ray (using a Kβ absorption plate), tube voltage 40 kV, tube current 30 mA Optical system: concentration method Divergence slit: ⅔ degree, scattering slit: ⅔ degree, light receiving slit: 0.300 mm Scan mode: 2θ/θ scan 2θ scan range: 3.0000 degrees to 55.0000 degrees Angle step width: 0.0200 degrees Scanning speed: 4.0000 degrees/min Detector: scintillation counter Sample holder: glass holder having depth of 0.2 mm A data processing method (method of obtaining an intensity) of each peak was performed by the method described above.

(6) Measurement of Amount of Strong Acid Point (pKa: −8.2 or Less) (Titration Using Hammett Indicator (Hammett Titration))

In a nitrogen atmosphere, 0.2 g of a sample and 2 mL of toluene were added to a test tube to prepare a slurry. A 0.01 mol/L toluene titration solution of anthraquinone, which is an indicator of an amount of acid having a pKa of −8.2 or less, was separately prepared, and 50 μL of the above 0.01 mol/L toluene titration solution of anthraquinone each was added thereto by an automatic titration device (GT-100 manufactured by Dia Instruments Co., Ltd.). An amount of anthraquinone required until the peak intensity of an absorption peak (430 nm) of yellow, which is acidic color of the indicator, does not change by an ultraviolet-visible absorptiometer (PMA-11 manufactured by Hamamatsu Photonics K.K.) is defined as the amount of the acid site having a pKa of −8.2 or less.

2. SYNTHESIS OF COMPONENT (II) (METALLOCENE COMPOUND)

(1) Synthesis of rac-dichloro[1,1'-dimethylsilylenebis{2-(5-methyl-2-furyl)-4-(4-i-propylphenyl)indenyl}]hafnium (Complex I)

The rac-dichloro[1,1'-dimethylsilylenebis{2-(5-methyl-2-furyl)-4-(4-i-propylphenyl)indenyl}]hafnium was synthesized in the same manner as in Synthesis Example 1 in JP-A-2012-149160.

(2) Synthesis of rac-dichloro[1,1'-dimethylsilylenebis{2-methyl-4-(4-chlorophenyl)-4-hydroazurenyl}]hafnium (Complex II)

The rac-dichloro[1,1'-dimethylsilylenebis{2-methyl-4-(4-chlorophenyl)-4-hydroazurenyl}]hafnium was synthesized in the same manner as described in Example 7 in JP-A-H11-240909.

(3) Synthesis of dichlorosilacyclobutylenebis[2-(5-methyl-2-furyl)-4-(4-t-butylphenyl)-5,6-dimethyl-1-indenyl]zirconium (Complex III)

The dichlorosilacyclobutylenebis[2-(5-methyl-2-furyl)-4-(4-t-butylphenyl)-5,6-dimethyl-1-indenyl]zirconium was synthesized in the same manner as in Example 7 in JP-A-2015-193605.

3. EXAMPLES

(1) Example 1-1A

Step (1-1) Grinding of Ion-exchangeable First Layered Silicate (A): Step (1) and Step (2)

As the ion-exchangeable first layered silicate (A) as a raw material, "Benclay KK" manufactured by Mizusawa Industrial Chemicals, Ltd. and containing smectite-group montmorillonite having a 2:1 type layer structure as a main component was used.

A chemical composition (% by weight) of the raw material montmorillonite thereof was Al of 10.0, Si of 31.1, Fe of 1.80, Mg of 3.03, Na of 3.04, K of 0.31, and Ca of 0.19. Si(s)/S(t) was 0.907 and Mg/Al was 0.302. An average particle diameter of smectite dispersed in an aqueous solvent was 0.54 μm. A Rosin-Rammler distribution constant n was 1.46. A method for preparing an aqueous slurry thereof and a method for measuring the aqueous slurry were according to the methods described above.

0.72 kg of the raw material thereof was dispersed in 17.28 kg of purified water to prepare 18 kg of an aqueous slurry of the ion-exchangeable first layered silicate (A) having a solid content concentration of 4% by weight. A total amount of the aqueous slurry was ground for 30 minutes while circulating the aqueous slurry at a peripheral speed of 15 m/s, a flow rate of 14 L/min, and a flow velocity in pipe of 0.34 L/min using, as a grinding medium, 0.1 mm zirconia beads at a filling rate of 85% with respect to a grinding volume by a MUGEN-FLOW MGF2 (manufactured by Ashizawa Finetech Co., Ltd.) of a grinder which was a wet bead mill having a grinding volume of 1.7 L, thereby obtaining an aqueous slurry of an ion-exchangeable second layered silicate (B).

The aqueous slurry that was extracted in an amount of 200 mL for particle size measurement in a well stirred state, was put in a Teflon (registered trademark) vat, and dried for about 12 hours in a constant temperature dryer set at 110° C. As a result of redispersing the dried sample in the aqueous solvent and measuring a particle diameter, an average particle diameter of smectite was 0.16 μm. The Rosin-Rammler distribution constant n was 3.53, and it was confirmed that particles having a small particle size and a narrow particle size distribution were obtained. A method for preparing the aqueous slurry thereof and a method for measuring the aqueous slurry were according to the methods described above.

Step (1-2) Spray Drying Granulation of Ion-exchangeable Second Layered Silicate (B): Step (3)

4 L of the aqueous slurry of the ion-exchangeable second layered silicate (B) obtained in the above step (1-1) was extracted while well stirred. A viscosity of the aqueous slurry was 5.45 cp. Using a spray drying granulation device ("L-8" manufactured by Ohkawara Kakohki Co., Ltd.), spray drying granulation of the above smectite and aqueous slurry was performed under the following conditions.

Atomizer format: M type rotary disc
Atomizer rotation speed: 28000 rpm
Cyclone differential pressure: 0.8 kPa
Slurry supply rate: 0.8 kg/h
Inlet temperature: 150° C.
Outlet temperature: 110° C. to 120° C.

As a result of spray-drying granulation, 147 g of ion-exchangeable first layered silicate granulated particles (C) having an average particle diameter of 13.4 μm were collected.

XRD measurement of the ion-exchangeable first layered silicate granulated particles (C) revealed that each of peaks corresponding to the peaks (x) and (y) were detected one by one in a range of 2θ of 5.0 degrees to 25.0 degrees, but no clear peak corresponding to the peak (z) was detected. The results were summarized in Table 1.

A chemical composition (% by weight) of the ion-exchangeable first layered silicate granulated particles (C) was Al of 10.0, Si of 31.2, Fe of 1.80, Mg of 3.03, Na of 3.00, K of 0.31, and Ca of 0.19. Si(s)/Si(t) was 0.911 and Mg/Al was 0.335.

Step (1-3) Contact of Ion-Exchangeable First Layered Silicate Granulated Particles (C) with Acid: Step (4)

650 g of distilled water was put into a 2 L separable flask equipped with a stirring blade and a reflux device, and 83.3 g of 98% sulfuric acid was added dropwise thereto. Heating was performed in an oil bath until an internal temperature reached 95° C. When the internal temperature reached a target temperature, 100 g of the ion-exchangeable first layered silicate granulated particles (C) obtained in the above step was further added, and stirring was continued.

Thereafter, the mixture was reacted for 480 minutes while maintaining the temperature at 95° C. The reaction was stopped by adding a reaction solution thereof to 500 g of distilled water, and a slurry thereof was filtered by a device in which an aspirator was connected to a Nutsche and a suction bottle. The above chemically treated ion-exchangeable second layered silicate granulated particles (D) in cake-like form after filtration were rinsed with 250 g of distilled water. A cake thus obtained was sampled in an amount of 4 g and dried in an oven at 95° C. for 2 hours or more to determine a solid content in the cake. The solid content in 1 g of the cake was 0.31 g. A chemical composition (% by weight) of the chemically treated ion-exchangeable second layered silicate granulated particles (D) was Al of 7.18, Si of 38.95 (Al/Si=0.192), and Mg of 1.96, and Al eluted by the treatment was 40.4%. A washing ratio was 0.11. A specific surface area was 429 $m^2/g$.

Step (1-4) Chemical Treatment with Salts and/or Bases of Chemically Treated Ion-Exchangeable Second Layered Silicate Granulated Particles (D): Step (5)

Distilled water was added to the cake of the above chemically treated ion-exchangeable second layered silicate granulated particles (D) so as to have a montmorillonite concentration of 16.5% by weight. A pH of the slurry at this time was 1.03. A temperature was raised to 40° C., and a lithium hydroxide aqueous solution adjusted to a concentration of 1.5 mol/L was added dropwise thereto until the pH of the slurry reached 6.50. An amount of the lithium hydroxide aqueous solution added dropwise was 202.2 g. The mixture was allowed to react for 90 minutes while maintaining the temperature at 40° C. The pH of the slurry at the end of the reaction was 5.95. The reaction slurry was filtered by a device in which an aspirator was connected to a Nutsche and a suction bottle, and washed four times with 750 g of distilled water. The collected cake was dried at 110° C. overnight. Further, before using as a catalyst component, drying under reduced pressure at 200° C. was performed for 5 hours to obtain 65 g of chemically treated ion-exchangeable third layered silicate granulated particles (E). A strongly acidic point having a pKa of −8.2 or less of the chemically treated ion-exchangeable third layered silicate granulated particles (E) was 50 μmol/g.

(1)' Example 2-1

Step (1-5) Method for Producing Catalyst for Olefin Polymerization

The following operation was performed using a deoxygenated and dehydrated solvent and monomer in an inert gas.
(1-5-1) Preparation of Catalyst In a three-necked flask (volume: 1 L), 10 g of the chemically treated ion-exchangeable third layered silicate granulated particles (E) obtained in the above step (1-4) and heptane (66 mL) were added to form a slurry, and triisobutylaluminum (TiBA, 25 mmol: 34.0 mL of a heptane solution having a concentration of 143 mg/mL) was added thereto, and the mixture was stirred for 1 hour and then washed with heptane until a residual liquid ratio became 1/100 to make a total volume 50 mL.

In another flask (volume: 200 mL), rac-dichloro[1,1'-dimethylsilylenebis{2-methyl-4-(4-chlorophenyl)-4-hydroazulenyl}]hafnium (complex I, 54 μmop was dissolved in toluene (9 mL) (solution 1). Further, in another flask (volume: 200 mL), rac-dichloro[1,1'-dimethylsilylenebis{2-(5-methyl-2-furyl)-4-(4-i-propylphenyl)indenyl}]hafnium (complex II, 126 μmop was dissolved in toluene (21 mL) (solution 2).

A 1 L flask containing the chemically treated ion-exchangeable third layered silicate granulated particles (E) was placed in an oil bath heated to 50° C., after 5 minutes, triisobutylaluminum (0.21 mmol: 0.3 mL of a heptane solution having a concentration of 143 mg/mL) was added, and the above solution 1 (9 mL) was added, followed by stirring at 50° C. for 60 minutes.

Thereafter, trinormaloctylaluminum (1.76 mmol: 4.5 mL of a heptane solution having a concentration of 143 mg/mL) was added thereto, and then the above solution 2 was added thereto, followed by stirring at 50° C. for 20 minutes.
(1-5-2) Pre-Polymerization To the reaction slurry above, 165 mL of heptane was added, and the slurry was introduced into a 1 L autoclave. After an internal temperature of the autoclave was set to 40° C., propylene was fed at a rate of 5 g/hour, and pre-polymerization was performed while maintaining the temperature at 40° C. for 4 hours. Thereafter, the propylene feed was stopped, and residual polymerization was performed for 1 hour. After removing the supernatant of the obtained catalyst slurry by decantation, triisobutylaluminum (6 mmol: 8.5 mL of a heptane solution having a concentration of 143 mg/mL) was added to a remaining portion, followed by stirring for 5 minutes.

The solid was dried under reduced pressure for 1 hour to obtain 30.8 g of a dry pre-polymerized catalyst. A pre-polymerization ratio (a value obtained by dividing an amount of the pre-polymerized polymer by an amount of the solid catalyst) was 2.05.

(1)" Example 3-1

Step (1-6) Polymerization of Propylene

After an inside of a stirring-type autoclave having an internal volume of 3 L was sufficiently replaced with propylene, 5.6 mL (4.04 mmol) of a heptane solution of triisobutylaluminum was added, 44 mL of hydrogen and 750 g of liquid propylene were introduced, and a temperature was raised to 70° C. to maintain the temperature. The dry pre-polymerized catalyst obtained in the (1-5-2) above was slurried with heptane, and 40 mg (excluding a weight of the pre-polymerized polymer) of the slurried pre-polymerized catalyst was pressed therein as a catalyst to initiate polymerization. The polymerization was continued for 1 hour while maintaining the internal temperature at 70° C. Thereafter, 5 mL of ethanol was added to stop the polymerization reaction. The residual gas was purged to obtain a polymer. The obtained polymer was dried at 90° C. for 1 hour.

As a result, 253.1 g of a polymer was obtained. A catalytic activity was 6328 g-PP/g-catalyst/hr. MFR was 0.85 g/10 min. The polymerization results were shown in Table 2.

(2) Example 1-2A

Step (2-1) Grinding of Ion-exchangeable First Layered Silicate (A): Step (1) and Step (2)

An aqueous slurry of the ion-exchangeable second layered silicate (B) was obtained in the same manner as in step (1-1) in Example 1-1A, except that a grinding time was 165 minutes in grinding by a wet bead mill. The results were summarized in Table 1.
Step (2-2) Spray Drying Granulation of Ion-Exchangeable Second Layered Silicate (B): Step (3)

4 L of the aqueous slurry of the ion-exchangeable second layered silicate (B) obtained in the above step (2-1) was extracted while well stirred. A viscosity of the aqueous slurry was 5.05 cp. Spray drying granulation was performed in the same manner as in the step (1-2) in Example 1-1A, and 140 g of ion-exchangeable first layered silicate granulated particles (C) having an average particle diameter of 13.2 μm were collected.

XRD measurement of the ion-exchangeable first layered silicate granulated particles (C) revealed that each of peaks corresponding to the peaks (x) and (y) were detected one by one in a range of 2θ of 5.0 degrees to 25.0 degrees, but no clear peak corresponding to the peak (z) was detected. The results were summarized in Table 1.

A chemical composition (% by weight) of the ion-exchangeable first layered silicate granulated particles (C) was Al of 9.99, Si of 31.2, Fe of 1.80, Mg of 3.03, Na of 2.99, K of 0.31, and Ca of 0.19. Si(s)/Si(t) was 0.909, and Mg/Al was 0.337.
Step (2-3) Contact of Ion-Exchangeable First Layered Silicate Granulated Particles (C) with Acid: Step (4)

Contact with acid was performed in the same manner as in the step (1-3) in Example 1-1A, except that the first layered silicate granulated particles (C) obtained in the above step (2-2) were used. A solid content in 1 g of a cake was 0.31 g. A chemical composition (% by weight) of the chemically treated ion-exchangeable second layered silicate granulated particles (D) was Al of 7.44, Si of 39.3 (Al/Si=0.197), and Mg of 2.00, and Al eluted by the treatment was 38.8%. A washing ratio was 0.11. A specific surface area was 417 m²/g.
Step (2-4) Chemical Treatment with Salts and/or Bases of Chemically Treated Second Layered Silicate Granulated Particles (D): Step (5)

Distilled water was added to the cake of the above chemically treated ion-exchangeable second layered silicate granulated particles (D) so as to have a montmorillonite concentration of 16.5% by weight. A pH of the slurry at this time was 0.93. A temperature was raised to 40° C., and a lithium hydroxide aqueous solution adjusted to a concentration of 1.5 mol/L was added dropwise thereto until the pH of the slurry reached 6.50. An amount of the lithium hydroxide aqueous solution added dropwise was 205.3 g. The mixture was allowed to react for 90 minutes while maintaining the temperature at 40° C. The pH of the slurry at the end of the reaction was 5.90. The reaction slurry was filtered by a device in which an aspirator was connected to a Nutsche and a suction bottle, and washed four times with 750 g of distilled water. The collected cake was dried at 110° C. overnight. Further, before using as a catalyst component, drying under reduced pressure at 200° C. was performed for 5 hours to obtain 64 g of ion-exchangeable chemically treated third layered silicate granulated particles (E). A strong acid site having a pKa of −8.2 or less of the chemically treated ion-exchangeable third layered silicate granulated particles (E) was 47 µmol/g.

(2)' Example 2-2

Step (2-5) Method for Producing Catalyst for Olefin Polymerization 30.6 g of dry pre-polymerized catalyst was obtained in the same manner as in the step (1-5) in Example 2-1, except that the third layered silicate granulated particles (E) obtained in the above step (2-4) were used. A pre-polymerization ratio (a value obtained by dividing an amount of the pre-polymerized polymer by an amount of the solid catalyst) was 2.04.

(2)" Example 3-2

Step (2-6) Polymerization of Propylene

The same operation as in the step (1-6) in Example 3-1 was performed except that a dry pre-polymerized catalyst obtained from the above step (2-4) was used. As a result, 248.0 g of a polymer was obtained. A catalytic activity was 6200 g-PP/g-catalyst/hr. MFR was 0.75 g/10 min. The polymerization results were shown in Table 2.

(3) Example 1-3A

Step (3-1) Grinding of Ion-Exchangeable First Layered Silicate (A): Step (1) and Step (2)

An aqueous slurry of the ion-exchangeable second layered silicate (B) was obtained in the same manner as in the step (1-1) in Example 1-1A, except that a grinding time was 15 minutes in grinding by a wet bead mill. The results were summarized in Table 1.

Step (3-2) Spray Drying Granulation of Ion-Exchangeable Second Layered Silicate (B): Step (3)

4 L of the aqueous slurry of the ion-exchangeable second layered silicate (B) obtained in the above step (3-1) was extracted while well stirred. A viscosity of the aqueous slurry was 6.05 cp. Spray drying granulation was performed in the same manner as in the step (1-2) in Example 1-1A, and 135 g of ion-exchangeable first layered silicate granulated particles (C) having an average particle diameter of 14.0 µm were collected.

XRD measurement of the ion-exchangeable first layered silicate granulated particles (C) revealed that each of peaks corresponding to the peaks (x) and (y) were detected one by one in a range of 2θ of 5.0 degrees to 25.0 degrees, but no clear peak corresponding to the peak (z) was detected. The results were summarized in Table 1.

A chemical composition (% by weight) of the ion-exchangeable first layered silicate granulated particles (C) was Al of 10.0, Si of 31.2, Fe of 1.79, Mg of 3.03, Na of 3.00, K of 0.31, and Ca of 0.19. Si(s)/Si(t) was 0.911 and Mg/Al was 0.335.

Step (3-3) Contact of Ion-Exchangeable First Layered Silicate Granulated Particles (C) with Acid: Step (4)

Contact with acid was performed in the same manner as in the step (1-3) in Example 1-1A, except that the first layered silicate granulated particles (C) obtained in the above step (3-2) were used. A solid content in 1 g of a cake was 0.31 g. A chemical composition (% by weight) of the chemically treated ion-exchangeable second layered silicate granulated particles (D) was Al of 7.08, Si of 38.68 (Al/Si=0.190), and Mg of 1.82, and Al eluted by the treatment was 40.8%. A washing ratio was 0.11. A specific surface area was 399 m²/g.

Step (3-4) Chemical Treatment with Salts and/or Bases of Chemically Treated Second Layered Silicate Granulated Particles (D): Step (5)

Distilled water was added to the cake of the above chemically treated ion-exchangeable second layered silicate granulated particles (D) so as to have a montmorillonite concentration of 16.5% by weight. A pH of the slurry at this time was 0.93. A temperature was raised to 40° C., and a lithium hydroxide aqueous solution adjusted to a concentration of 1.5 mol/L was added dropwise thereto until the pH of the slurry reached 6.50. An amount of the lithium hydroxide aqueous solution added dropwise was 203.0 g. The mixture was allowed to react for 90 minutes while maintaining the temperature at 40° C. A pH of the slurry at the end of the reaction was 6.01. The reaction slurry was filtered by a device in which an aspirator was connected to a Nutsche and a suction bottle, and washed four times with 750 g of distilled water. The collected cake was dried at 110° C. overnight. Further, before using as a catalyst component, drying under reduced pressure at 200° C. was performed for 5 hours to obtain 69 g of ion-exchangeable chemically treated third layered silicate granulated particles (E). A strong acid site having a pKa of −8.2 or less of the chemically treated ion-exchangeable third layered silicate granulated particles (E) was 46 µmol/g.

(3)' Example 2-3

Step (3-5) Method for Producing Catalyst for Olefin Polymerization 31.0 g of dry pre-polymerized catalyst was obtained in the same manner as in step (1-5) in the Example 2-1, except that the third layered silicate granulated particles (E) obtained in the above step (3-4) were used. A pre-polymerization ratio (a value obtained by dividing an amount of the pre-polymerized polymer by an amount of the solid catalyst) was 2.07.

(3)" Example 3-3

Step (3-6) Polymerization of Propylene

The same operation as in the step (1-6) in Example 3-1 was performed except that the dry pre-polymerized catalyst obtained from the above step (3-5) was used. As a result, 240.8 g of a polymer was obtained. A catalytic activity was 6020 g-PP/g-catalyst/hr. MFR was 0.92 g/10 min. The polymerization results were shown in Table 2.

(4) Example 1-4A

Step (4-1) Grinding of Ion-Exchangeable First Layered Silicate (A): Step (1) and Step (2)

The same ion-exchangeable layered silicate (A) as in Example 1-1A was used.

0.16 Kg of raw material thereof was dispersed in 3.84 kg of purified water to prepare 4 kg of an aqueous slurry of the ion-exchangeable first layered silicate (A) having a solid content concentration of 4% by weight. A total amount of the aqueous slurry was ground for 90 minutes while circulating the aqueous slurry at a peripheral speed of 14 m/s, a flow rate of 2.7 L/min, and a flow velocity in pipe of 0.06 L/min using, as a grinding medium, 0.1 mm zirconia beads at a filling rate of 85% with respect to a grinding volume by a Star Mill ZRS2 (manufactured by Ashizawa Finetech Co., Ltd.) of a grinder which was a wet bead mill having a grinding volume of 1.5 L, thereby obtaining an aqueous slurry of an ion-exchangeable second layered silicate (B).

The aqueous slurry that was extracted in an amount of 200 mL for particle size measurement in a well stirred state, was put in a Teflon (registered trademark) vat, and dried for about 12 hours in a constant temperature dryer set at 110° C. As a result of redispersing the dried sample in an aqueous solvent and measuring the particle size, the average particle diameter of smectite was 0.29 µm. A Rosin-Rammler distribution constant n was 2.41, and it was confirmed that particles having a narrow particle size distribution were obtained. A method for preparing the aqueous slurry thereof and a method for measuring the aqueous slurry were according to the methods described above.

Step (4-2) Spray Drying Granulation of Ion-Exchangeable Second Layered Silicate (B): Step (3)

4 L of the aqueous slurry of the ion-exchangeable second layered silicate (B) obtained in the above step (4-1) was extracted while well stirred. A viscosity of the aqueous slurry was 5.45 cp. Spray drying granulation was performed in the same manner as in step (1-2) in Example 1-1A, and 135 g of ion-exchangeable first layered silicate granulated particles (C) having an average particle diameter of 14.1 µm were collected.

XRD measurement of the ion-exchangeable first layered silicate granulated particles (C) revealed that each of peaks corresponding to the peaks (x) and (y) were detected one by one in a range of 2θ of 5.0 degrees to 25.0 degrees, but no clear peak corresponding to the peak (z) was detected. The results were summarized in Table 1.

A chemical composition (% by weight) of the ion-exchangeable first layered silicate granulated particles (C) was Al of 10.0, Si of 31.2, Fe of 1.79, Mg of 3.03, Na of 3.04, K of 0.31, and Ca of 0.19. Si(s)/Si(t) was 0.911, and Mg/Al was 0.336.

Step (4-3) Contact of Ion-Exchangeable First Layered Silicate Granulated Particles (C) with Acid: Step (4)

Contact with acid was performed in the same manner as in the step (1-3) in Example 1-1A, except that the second layered silicate granulated particles (C) obtained in the above step (4-2) were used. A solid content in 1 g of a cake was 0.31 g. A chemical composition (% by weight) of the chemically treated ion-exchangeable second layered silicate granulated particles (D) was Al of 7.05, Si of 40.5 (Al/Si=0.179), and Mg of 1.79, and Al eluted by the treatment was 43.7%. A washing ratio was 0.11. A specific surface area was 374 m$^2$/g.

Step (4-4) Chemical Treatment with Salts and/or Bases of Chemically Treated Second Layered Silicate Granulated Particles (D): Step (5)

Distilled water was added to the cake of the above chemically treated ion-exchangeable second layered silicate granulated particles (D) so as to have a montmorillonite concentration of 16.5% by weight. A pH of the slurry at this time was 0.85. A temperature was raised to 40° C., and a lithium hydroxide aqueous solution adjusted to a concentration of 1.5 mol/L was added dropwise thereto until the pH of the slurry reached 6.50. An amount of the lithium hydroxide aqueous solution added dropwise was 204.0 g. The mixture was allowed to react for 90 minutes while maintaining the temperature at 40° C. The pH of the slurry at the end of the reaction was 6.05. The reaction slurry was filtered by a device in which an aspirator was connected to a Nutsche and a suction bottle, and washed four times with 750 g of distilled water. The collected cake was dried at 110° C. overnight. Further, before using as a catalyst component, drying under reduced pressure at 200° C. was performed for 5 hours to obtain 65 g of chemically treated ion-exchangeable third layered silicate granulated particles (E). A strong acid site having a pKa of −8.2 or less of the chemically treated ion-exchangeable third layered silicate granulated particles (E) was 34 µmol/g.

(4)' Example 2-4

Step (4-5) Method for Producing Catalyst for Olefin Polymerization 31.0 g of dry pre-polymerized catalyst was obtained in the same manner as in the step (1-5) in Example 2-1, except that the third layered silicate granulated particles (E) obtained in the above step (4-4) were used. A pre-polymerization ratio (a value obtained by dividing an amount of the pre-polymerized polymer by an amount of the solid catalyst) was 2.07.

(4)'' Example 3-4

Step (4-6) Polymerization of Propylene

The same operation as in the step (1-6) in Example 3-1 was performed except that the dry pre-polymerized catalyst obtained from the above step (4-5) was used. As a result, 221.0 g of a polymer was obtained. A catalytic activity was 5525 g-PP/g-catalyst/hr. MFR was 1.15 g/10 min. The polymerization results were shown in Table 2.

(5) Example 1-5A

Step (5-1) Ion-Exchangeable Second Layered Silicate (B)

As a raw material of the ion-exchangeable layered silicate, purified montmorillonite manufactured by Mizusawa Industrial Co., Ltd. and containing smectite-group montmorillonite having a 2:1 type layer structure as a main component was used. As a result of redispersing the raw material of the ion-exchangeable layered silicate in an aqueous solvent and measuring a particle diameter, an average particle diameter of smectite was 0.18 µm. A Rosin-Rammler distribution constant n was 4.29, and it was confirmed that particles having a small particle diameter and a narrow particle size distribution were obtained, so that the particles were subjected to the following step as the ion-exchangeable second layered silicate without performing a grinding treatment. A method for measuring the aqueous slurry was in accordance with the method described above.

Step (5-2) Spray Drying Granulation of Ion-Exchangeable Second Layered Silicate (B): Step (3)

1.2 L of the aqueous slurry of the ion-exchangeable second layered silicate (B) obtained in the above step (5-1) was extracted while well stirred. A viscosity of the aqueous slurry was 19.0 cp. Using a spray drying granulation device ("L-8" manufactured by Ohkawara Kakohki Co., Ltd.), spray drying granulation of the above smectite/aqueous slurry was performed under the following conditions.

Atomizer format: M type rotary disc
Atomizer rotation speed: 28000 rpm
Cyclone differential pressure: 0.8 kPa
Slurry supply rate: 0.8 kg/h Inlet temperature: 150° C.

Outlet temperature: 110° C. to 120° C.

As a result of spray-drying granulation, 50 g of ion-exchangeable first layered silicate granulated particles (C) having an average particle diameter of 12.6 μm were collected.

XRD measurement of the ion-exchangeable first layered silicate granulated particles (C) revealed that each of peaks corresponding to the peaks (x) and (y) were detected one by one in a range of 2θ of 5.0 degrees to 25.0 degrees, but no clear peak corresponding to the peak (z) was detected. The results were summarized in Table 1.

A chemical composition (% by weight) of the ion-exchangeable first layered silicate granulated particles (C) was Al of 9.11, Si of 30.5, Fe of 2.05, Mg of 4.40, Na of 2.37, K of 0.46, and Ca of 0.65. Si(s)/Si(t) was 0.998 and Mg/Al was 0.537.

Step (5-3) Contact of Ion-Exchangeable First Layered Silicate Granulated Particles (C) with Acid: Step (4)

325 g of distilled water was put into a 2 L separable flask equipped with a stirring blade and a reflux device, and 41.7 g of 98% sulfuric acid was added dropwise thereto. Heating was performed in an oil bath until an internal temperature reached 95° C. When the internal temperature reached a target temperature, 50 g of the ion-exchangeable first layered silicate granulated particles (C) obtained in the above step was further added, and stirring was continued.

Thereafter, the mixture was reacted for 270 minutes while maintaining the temperature at 95° C. The reaction was stopped by adding the reaction solution to 250 g of distilled water, and the slurry was filtered by a device in which an aspirator was connected to a Nutsche and a suction bottle. The above chemically treated ion-exchangeable second layered silicate granulated particles (D) in cake-like form after filtration were added to 125 g of distilled water to form a slurry, and an operation of filtering the slurry again was repeated five times to wash. A cake thus obtained was sampled in an amount of 2 g and dried in an oven at 95° C. for 2 hours or more to determine a solid content in the cake. A solid content in 1 g of the cake was 0.31 g. A chemical composition (% by weight) of the chemically treated ion-exchangeable second layered silicate granulated particles (D) was Al of 6.25, Si of 38.13 (Al/Si=0.171), and Mg of 2.07, and Al eluted by the treatment was 45.2%. A washing ratio was 0.01. A specific surface area was 534 m$^2$/g.

Step (5-4) Chemical Treatment with Salts and/or Bases of Chemically Treated Ion-Exchangeable Second Layered Silicate Granulated Particles (D): Step (5)

Distilled water was added to the cake of the above chemically treated ion-exchangeable second layered silicate granulated particles (D) so as to have a montmorillonite concentration of 14.3% by weight, and the mixture was heated so as to have an internal temperature of 40° C. A pH of the slurry at this time was 3.43. 32.5 g of lithium sulfate monohydrate was added thereto, and the mixture was allowed to react for 120 minutes while maintaining a temperature at 40° C. The pH of the slurry at the end of the reaction was 3.55. The reaction slurry was filtered by a device in which an aspirator was connected to a Nutsche and a suction bottle, and washed four times with 400 g of distilled water. The collected cake was dried at 110° C. overnight. Further, before using as a catalyst component, drying under reduced pressure at 200° C. was performed for 5 hours to obtain 35 g of ion-exchangeable chemically treated third layered silicate granulated particles (E). A strong acid site having a pKa of −8.2 or less of the chemically treated ion-exchangeable third layered silicate granulated particles (E) was 45 μmol/g.

(5)' Example 2-5

Step (5-5) Method for Producing Catalyst for Olefin Polymerization 22.3 g of dry pre-polymerized catalyst was obtained in the same manner as in the step (1-5) in Example 2-1, except that the third layered silicate granulated particles (E) obtained in the above step (5-4) were used. A pre-polymerization ratio (a value obtained by dividing an amount of the pre-polymerized polymer by an amount of the solid catalyst) was 1.18.

Step (5-6) Polymerization of Propylene

The same operation as in the step (1-6) in Example 3-1 was performed except that the dry pre-polymerized catalyst obtained from the above step (5-5) was used. As a result, 225.0 g of a polymer was obtained. A catalytic activity was 5625 g-PP/g-catalyst/hr. MFR was 1.05 g/10 min. The polymerization results were shown in Table 2.

(6) Example 2-6

Step (6-5) Method for Producing Catalyst for Olefin Polymerization

The following operation was performed using a deoxygenated and dehydrated solvent and monomer in an inert gas.

(6-5-1) Preparation of Catalyst

In a three-necked flask (volume: 1 L), 10 g of the third layered silicate granulated particles (E) obtained in Example 1-1A and heptane (66 mL) were added to form a slurry, and triisobutylaluminum (TiBA, 25 mmol: 34.0 mL of a heptane solution having a concentration of 143 mg/mL) was added thereto, and the mixture was stirred for 1 hour and then washed with heptane until the residual liquid ratio became 1/100 to make a total volume 50 mL.

In another flask (volume: 200 mL), dichlorosilacyclobutylenebis[2-(5-methyl-2-furyl)-4-(4-t-butylphenyl)-5,6-dimethyl-1-indenyl]zirconium (complex III, 300 μmol) was dissolved in toluene (30 mL) (solution 3).

A 1 L flask containing the chemically treated ion-exchangeable third layered silicate granulated particles (E) was placed in an oil bath heated to 40° C., after 5 minutes, trinormaloctylaluminum (1.76 mmol: 31 mL of a heptane solution having a concentration of 143 mg/mL) was added, and then the above solution 3 (30 mL) was added, followed by stirring at 40° C. for 60 minutes.

(6-5-2) Pre-Polymerization

To the above reaction slurry, 189 mL of heptane was added, and the slurry was introduced into a 1 L autoclave. After an internal temperature of the autoclave was set to 40° C., propylene was fed at a rate of 10 g/hour, and pre-polymerization was performed while maintaining the temperature at 40° C. for 2 hours. Thereafter, the propylene feed was stopped, and residual polymerization was performed for 1 hour. After removing the supernatant of the obtained catalyst slurry by decantation, triisobutylaluminum (6 mmol: 8.5 mL of a heptane solution having a concentration of 143 mg/mL) was added to a remaining portion, followed by stirring for 5 minutes.

The solid was dried under reduced pressure for 1 hour to obtain 33.9 g of a dry pre-polymerized catalyst. A pre-polymerization ratio (a value obtained by dividing an amount of the pre-polymerized polymer by an amount of the solid catalyst) was 2.29.

(6)' Example 3-6

Step (6-6) Polymerization of Propylene

After an inside of a stirring-type autoclave having an internal volume of 3 L was sufficiently replaced with propylene, 2.8 mL (2.02 mmol) of a heptane solution of triisobutylaluminum was added, 506 mL of hydrogen and 750 g of liquid propylene were introduced, and a temperature was raised to 65° C. to maintain the temperature. The dry pre-polymerized catalyst obtained in (6-5-2) above was slurried with heptane, and 10 mg (excluding the weight of the prepolymerized polymer) of the slurried pre-polymerized catalyst was pressed therein as a catalyst to initiate polymerization. The polymerization was continued for 1 hour while maintaining the internal temperature at 65° C. Thereafter, 5 mL of ethanol was added to stop the polymerization reaction. The residual gas was purged to obtain a polymer. The obtained polymer was dried at 90° C. for 1 hour.

As a result, 380.0 g of a polymer was obtained. A catalytic activity was 38000 g-PP/g-catalyst/hr. MFR was 12.5 g/10 min. The polymerization results were shown in Table 3.

(7) Example 2-7

Step (7-5) Method for Producing Catalyst for Olefin Polymerization

A catalyst preparation and a pre-polymerization operation were performed in the same manner as in the step (6-5) in Example 2-6 except that the third layered silicate granulated particles (E) in Example 1-3A were used, and 33.5 g of a dry pre-polymerized catalyst was obtained. A pre-polymerization ratio (a value obtained by dividing an amount of the pre-polymerized polymer by an amount of the solid catalyst) was 2.24.

(7)' Example 3-7

Step (7-6) Polymerization of Propylene

Polymerization was performed in the same manner as in the step (6-6) in Example 3-6, except that the dry pre-polymerized catalyst obtained from the above step (7-5) was used. As a result, 422.7 g of a polymer was obtained. A catalytic activity was 42270 g-PP/g-catalyst/hr. MFR was 21.2 g/10 min. The polymerization results were shown in Table 3.

(8) Example 2-8

Step (8-5) Method for Producing Catalyst for Olefin Polymerization

A catalyst preparation and a pre-polymerization operation were performed in the same manner as in the step (6-5) in Example 2-6 except that the third layered silicate granulated particles (E) in Example 1-5A were used, and 29.1 g of a dry pre-polymerized catalyst was obtained. A pre-polymerization ratio (a value obtained by dividing an amount of the pre-polymerized polymer by an amount of the solid catalyst) was 1.83.

(8)' Example 3-8

Step (8-6) Polymerization of Propylene

Polymerization was performed in the same manner as in the step (6-6) in Example 3-6, except that the dry pre-polymerized catalyst obtained from the above step (8-5) was used. As a result, 422.7 g of a polymer was obtained. A catalytic activity was 42270 g-PP/g-catalyst/hr. MFR was 21.2 g/10 min. The polymerization results are shown in Table 3.

4. COMPARATIVE EXAMPLE

(1) Comparative Example 1-1C

Step (1-1)' Ion-exchangeable First Layered Silicate (B)'

The same ion-exchangeable first layered silicate (A) as a clay used in the step (1-1) in Example 1-1A was used, but grinding was not performed. That is, the ion-exchangeable first layered silicate (A) was directly subjected to the following step as an ion-exchangeable second layered silicate (B)'. Therefore, an average particle diameter of smectite dispersed in an aqueous solvent was 0.54 μm. A Rosin-Rammler distribution constant n was 1.46. A method for preparing the aqueous slurry thereof and a method for measuring the aqueous slurry were according to the methods described above.

Step (1-2)' Spray Drying Granulation of Ion-exchangeable Second Layered Silicate (B)': Step (3)'

4 L of distilled water slurry having 4% by weight of ion-exchangeable second layered silicate (B)' in the above step (1-1)' was prepared and allowed to stand for one day. A viscosity of the aqueous slurry was 4.05 cp. Spray drying granulation was performed in the same manner as in the step (1-2) in Example 1-1A, and 133 g of ion-exchangeable first layered silicate granulated particles (C)' having an average particle diameter of 13.5 μm were collected.

XRD measurement of the ion-exchangeable first layered silicate granulated particles (C)' revealed that each of peaks corresponding to the peaks (x), (y), and (Z) were detected one by one in a range of 2θ of 5.0 degrees to 25.0 degrees. The results were summarized in Table 1.

A chemical composition (% by weight) of ion-exchangeable first layered silicate granulated particles (C)' was Al of 10.0, Si of 31.1, Fe of 1.80, Mg of 3.03, Na of 3.04, K of 0.31, and Ca of 0.19. In the smectite, Si(s)/S(t) was 0.907, and Mg/Al was 0.335.

Step (1-3)' Contact of Ion-Exchangeable First Layered Silicate Granulated Particles (C)' with Acid: step (4)'

Contact with acid was performed in the same manner as in the step (1-3) in Example 1-1A, except that the first layered silicate granulated particles (C)' obtained in the above step (1-2)' were used. A solid content in 1 g of a cake was 0.31 g. A chemical composition (% by weight) of the chemically treated ion-exchangeable second layered silicate granulated particles (D)' was Al of 7.13, Si of 38.50 (Al/Si=0.193), and Mg of 1.80, and Al eluted by the treatment was 40.1%. A washing ratio was 0.11. A specific surface area was 330 m²/g.

Step (1-4)' Chemical Treatment with Salts and/or Bases of Chemically Treated Ion-Exchangeable Second Layered Silicate Granulated Particles (D)': Step (5)'

Distilled water was added to the cake of the above chemically treated ion-exchangeable second layered silicate granulated particles (D)' so as to have a montmorillonite concentration of 16.5% by weight. A pH of the slurry at this time was 0.90. A temperature was raised to 40° C., and a lithium hydroxide aqueous solution adjusted to a concentration of 1.5 mol/L was added dropwise thereto until the pH of the slurry reached 6.50. An amount of the lithium hydroxide aqueous solution added dropwise was 204.1 g. The mixture was allowed to react for 90 minutes while maintaining the temperature at 40° C. The pH of the slurry at the end of the reaction was 6.00. The reaction slurry was filtered by a device in which an aspirator was connected to a Nutsche and a suction bottle, and washed four times with 750 g of distilled water. The collected cake was dried at 110° C. overnight. Further, before using as a catalyst component, drying under reduced pressure at 200° C. was performed for 5 hours to obtain 62 g of ion-exchangeable chemically treated third layered silicate granulated particles (E)'. A strong acid site having a pKa of −8.2 or less of the chemically treated ion-exchangeable third layered silicate granulated particles (E)' was 29 μmol/g.

(1)' Comparative Example 2-1

Step (1-5)' Method for Producing Catalyst for Olefin Polymerization 32.0 g of dry pre-polymerized catalyst was obtained in the same manner as in the step (1-5) in Example 2-1, except that the third layered silicate granulated particles (E)' obtained in the above step (1-4)' were used. A pre-polymerization ratio (a value obtained by dividing an amount of the pre-polymerized polymer by an amount of the solid catalyst) was 2.14.

(1)" Comparative Example 3-1

Step (1-6)' Polymerization of Propylene

The same operation as in the step (1-6) in Example 3-1 was performed except that the dry pre-polymerized catalyst obtained from the above step (1-5)' was used. As a result, 180.8 g of a polymer was obtained. A catalytic activity was 4520 g-PP/g-catalyst/hr. MFR was 1.50 g/10 min. The polymerization results were shown in Table 2.

(2) Comparative Example 1-2C

Step (2-1)' Ion-exchangeable First Layered Silicate (B)'

As the ion-exchangeable first layered silicate (A) as a raw material, "Benclay KK" manufactured by Mizusawa Industrial Chemicals, Ltd. and containing smectite-group montmorillonite having a 2:1 type layer structure as a main component was used. The production lot was different from that of the ion-exchangeable first layered silicate (A) used in the step (1-1) in Example 1-1A.

A chemical composition (% by weight) of raw material montmorillonite thereof was Al of 9.93, Si of 32.18, Fe of 1.80, Mg of 2.72, Na of 1.87, K of 0.41, and Ca of 0.20. An average particle diameter of smectite dispersed in the aqueous solvent was 0.47 μm. A Rosin-Rammler distribution constant n was 3.55. A method for preparing the aqueous slurry and a method for measuring the aqueous slurry were according to the methods described above. The ion-exchangeable layered silicate was not ground, and therefore was directly subjected to the following step as the ion-exchangeable second layered silicate (B)'.

Step (2-2)' Spray Drying Granulation of Ion-exchangeable Second Layered Silicate (B)': Step (3)'

4 L of distilled aqueous slurry having 4% by weight of ion-exchangeable second layered silicate (B)' in the above step (2-1)' was prepared and allowed to stand for one day. A viscosity of the aqueous slurry was 4.52 cp. Spray drying granulation was performed in the same manner as in the step (1-2) in Example 1-1A, and 130 g of ion-exchangeable first layered silicate granulated particles (C)' having an average particle diameter of 14.1 μm were collected.

XRD measurement of the ion-exchangeable first layered silicate granulated particles (C)' revealed that each of peaks corresponding to the peaks (x), (y), and (Z) were detected one by one in a range of 2θ of 5.0 degrees to 25.0 degrees. The results were summarized in Table 1.

A chemical composition (% by weight) of the ion-exchangeable first layered silicate granulated particles (C)' was Al of 9.93, Si of 32.18, Fe of 1.80, Mg of 2.72, Na of 1.87, K of 0.41, and Ca of 0.20. Si(s)/Si(t) was 0.942 and Mg/Al was 0.304.

Step (2-3)' Contact of Ion-exchangeable First Layered Silicate Granulated Particles (C) with Acid: Step (4)'

Contact with acid was performed in the same manner as in the step (1-3) in Example 1-1A, except that the first layered silicate granulated particles (C)' obtained in the above step (2-1)' were used. A solid content in 1 g of a cake was 0.31 g. A chemical composition (% by weight) of the chemically treated ion-exchangeable second layered silicate granulated particles (D)' was Al of 7.31, Si of 37.50 (Al/Si=0.203), and Mg of 1.83, and Al eluted by the treatment was 36.8%. A washing ratio was 0.11. A specific surface area was 340 m²/g.

Step (2-4)' Chemical Treatment with Salts and/or Bases of Chemically Treated Ion-Exchangeable Second Layered Silicate Granulated Particles (D)': Step (5)'

Distilled water was added to the cake of the above chemically treated ion-exchangeable second layered silicate granulated particles (D)' so as to have a montmorillonite concentration of 16.5% by weight. A pH of the slurry at this time was 0.95. A temperature was raised to 40° C., and a lithium hydroxide aqueous solution adjusted to a concentration of 1.5 mol/L was added dropwise thereto until the pH of the slurry reached 6.50. An amount of the lithium hydroxide aqueous solution added dropwise was 203.3 g. The mixture was allowed to react for 90 minutes while maintaining the temperature at 40° C. The pH of the slurry at the end of the reaction was 5.98. The reaction slurry was filtered by a device in which an aspirator was connected to a Nutsche and a suction bottle, and washed four times with 750 g of distilled water. The collected cake was dried at 110° C. overnight. Further, before using as a catalyst component, drying under reduced pressure at 200° C. was performed for 5 hours to obtain 65 g of ion-exchangeable chemically treated third layered silicate granulated particles (E)'. A strong acid site having a pKa of −8.2 or less of the chemically treated ion-exchangeable third layered silicate granulated particles (E)' was 29 μmol/g.

(2)' Comparative Example 2-2

Step (2-5)' Method for Producing Catalyst for Olefin Polymerization 31.3 g of dry pre-polymerized catalyst was obtained in the same manner as in the step (1-5) in Example 2-1, except that the third layered silicate granulated particles (E)' obtained in the above step (2-4)' were used. A pre-polymerization ratio (a value obtained by dividing an amount of the pre-polymerized polymer by an amount of the solid catalyst) was 2.09.

(2)" Comparative Example 3-2

Step (2-6)' Polymerization of Propylene

The same operation as in the step (1-6) in Example 3-1 was performed except that the dry pre-polymerized catalyst obtained from the above step (2-5)' was used. As a result, 182.6 g of a polymer was obtained. A catalytic activity was 4565 g-PP/g-catalyst/hr. MFR was 1.55 g/10 min. The polymerization results were shown in Table 2.

(3) Comparative Example 1-3C

Step (3-1)': Grinding of Ion-exchangeable First Layered Silicate (A): Steps (1)' and (2)'

The ion-exchangeable first layered silicate (B)' was obtained in the same manner as in the step (4-1) in Example 1-4A, except that grinding was performed for 1300 minutes under the conditions of a flow rate of 0.9 L/min and a flow velocity in pipe of 0.02 L/min in the grinding using a wet bead mill. As a result of the particle size measurement, an average particle diameter of smectite was 0.04 μm. It was confirmed that a Rosin-Rammler distribution constant n was 1.10 and particles having a wide particle size distribution were obtained. A method for preparing the aqueous slurry thereof and a method for measuring the aqueous slurry were according to the methods described above.

Step (3-2)' Spray Drying Granulation of Ion-Exchangeable Second Layered Silicate (B)': Step (3)'

A viscosity of the aqueous slurry of the ion-exchangeable second layered silicate (B)' obtained in the above step (3-1)' was 6.50 cp. Spray drying granulation was performed in the same manner as in the step (1-2) in Example 1-1A, and 128 g of ion-exchangeable first layered silicate granulated particles (C)' having an average particle diameter of 14.5 μm were collected.

XRD measurement of the ion-exchangeable first layered silicate granulated particles (C)' revealed that no clear peaks corresponding to the peaks (x), (y), and (z) were detected in a range of 2θ of 5.0 degrees to 25.0 degrees. This was probably due to a loss of crystal structure of smectite by an excessive advancing of the grinding. Therefore, no peak intensity ratio was calculated.

A chemical composition (% by weight) of the ion-exchangeable first layered silicate granulated particles (C)' was Al of 10.0, Si of 31.2, Fe of 1.79, Mg of 2.98, Na of 2.97, K of 0.31, and Ca of 0.18. Si(s)/Si(t) was 0.901, and Mg/Al was 0.331.

Step (3-3)' Contact of Ion-Exchangeable First Layered Silicate Granulated Particles (C)' with Acid: Step (4)'

Contact with acid was performed in the same manner as in the step (1-3) in Example 1-1A, except that the first layered silicate granulated particles (C)' obtained in the above step (3-2)' were used. A solid content in 1 g of the cake was 0.29 g. A chemical composition (% by weight) of the chemically treated ion-exchangeable second layered silicate granulated particles (D)' was Al of 7.02, Si of 39.6 (Al/Si=0.184), and Mg of 1.76, and Al eluted by the treatment was 42.7%. A washing ratio was 0.11. A specific surface area was 240 m²/g.

Step (3-4)' Chemical Treatment with Salts and/or Bases of Chemically Treated Ion-Exchangeable Second Layered Silicate Granulated Particles (D) (D)': Step (5)'

Distilled water was added to the cake of the above chemically treated ion-exchangeable second layered silicate granulated particles (D)' so as to have a montmorillonite concentration of 16.5% by weight. At this time, a pH of the slurry was 1.20. A temperature was raised to 40° C., and a lithium hydroxide aqueous solution adjusted to a concentration of 1.5 mol/L was added dropwise thereto until the pH of the slurry reached 6.50. An amount of the lithium hydroxide aqueous solution added dropwise was 200.5 g. The mixture was allowed to react for 90 minutes while maintaining the temperature at 40° C. The pH of the slurry at the end of the reaction was 5.87. The reaction slurry was filtered by a device in which an aspirator was connected to a Nutsche and a suction bottle, and washed four times with 750 g of distilled water. The collected cake was dried at 110° C. overnight. Further, before using as a catalyst component, drying under reduced pressure at 200° C. was performed for 5 hours to obtain 61 g of ion-exchangeable chemically treated third layered silicate granulated particles (E)'. A strong acid site having a pKa of −8.2 or less of the chemically treated ion-exchangeable third layered silicate granulated particles (E)' was 20 μmol/g.

(3)' Comparative Example 2-3 Step (3-5)' Method for Producing Catalyst for Olefin Polymerization 30.7 g of dry pre-polymerized catalyst was obtained in the same manner as in the step (1-5) in Example 2-1, except that the third layered silicate granulated particles (E)' obtained in the above step (3-4)' were used. A pre-polymerization ratio (a value obtained by dividing an amount of the pre-polymerized polymer by an amount of the solid catalyst) was 2.05.

(3)'' Comparative Example 3-3

Step (3-6)' Polymerization of Propylene

The same operation as in the step (1-6) in Example 3-1 was performed except that the dry pre-polymerized catalyst obtained from the above step (3-5)' was used. As a result, 168.6 g of a polymer was obtained. A catalytic activity was 4215 g-PP/g-catalyst/hr. MFR was 2.08 g/10 min. The polymerization results were shown in Table 2.

(4) Comparative Example 1-4C

Step (4-1)': Grinding of Ion-exchangeable First Layered Silicate (A): Steps (1)' and (2)'

The ion-exchangeable second layered silicate (B)' was obtained in the same manner as in the step (3-1)' in Comparative Example 1-3C, except that a grinding time was 600 minutes in grinding by a wet bead mill. As a result of the particle size measurement, an average particle diameter of smectite was 0.14 μm. It was confirmed that a Rosin-Rammler distribution constant n was 1.40 and particles having a wide particle size distribution were obtained. A method for preparing the aqueous slurry thereof and a method for measuring the aqueous slurry were according to the methods described above.

Step (4-2)' Spray Drying Granulation of Ion-Exchangeable Second Layered Silicate (B)': Step (3)'

A viscosity of the aqueous slurry of the ion-exchangeable second layered silicate (B)' obtained in the above step (4-1)' was 6.25 cp. The spray-drying granulation was performed in the same manner as in the step (1-2) in Example 1-1A, and 130 g of ion-exchangeable first layered silicate granulated particles (C)' having an average particle diameter of 14.2 μm were collected.

XRD measurement of the ion-exchangeable first layered silicate granulated particles (C)' revealed that each of peaks corresponding to the peaks (x), (y), and (Z) were detected one by one in a range of 2θ of 5.0 degrees to 25.0 degrees. The results were summarized in Table 1.

A chemical composition (% by weight) of the ion-exchangeable first layered silicate granulated particles (C)' was Al of 10.0, Si of 31.2, Fe of 1.80, Mg of 2.99, Na of 2.99, K of 0.31, and Ca of 0.18. Si(s)/Si(t) was 0.902, and Mg/Al was 0.331.

Step (4-3)' Contact of Ion-Exchangeable First Layered Silicate Granulated Particles (C)' with Acid: Step (4)'

Contact with acid was performed in the same manner as in the step (1-3) in Example 1-1A, except that the first layered silicate granulated particles (C)' obtained in the above step (4-2)' were used. A solid content in 1 g of the cake was 0.30 g. A chemical composition (% by weight) of the chemically treated ion-exchangeable second layered silicate granulated particles (D)' was Al of 7.10, Si of 38.7 (Al/

Si=0.191), and Mg of 1.77, and Al eluted by the treatment was 42.8%. A washing ratio was 0.11. A specific surface area was 325 m²/g.

Step (4-4)' Chemical Treatment with Salts and/or Bases of Chemically Treated Ion-Exchangeable Second Layered Silicate Granulated Particles (D)': Step (5)'

Distilled water was added to the cake of the above chemically treated ion-exchangeable second layered silicate granulated particles (D)' so as to have a montmorillonite concentration of 16.5% by weight. A pH of the slurry at this time was 1.15. A temperature was raised to 40° C., and a lithium hydroxide aqueous solution adjusted to a concentration of 1.5 mol/L was added dropwise thereto until the pH of the slurry reached 6.50. An amount of the lithium hydroxide aqueous solution added dropwise was 201.3 g. The mixture was allowed to react for 90 minutes while maintaining the temperature at 40° C. The pH of the slurry at the end of the reaction was 5.89. The reaction slurry was filtered by a device in which an aspirator was connected to a Nutsche and a suction bottle, and washed four times with 750 g of distilled water. The collected cake was dried at 110° C. overnight. Further, before using as a catalyst component, drying under reduced pressure at 200° C. was performed for 5 hours to obtain 65 g of ion-exchangeable chemically treated third layered silicate granulated particles (E)'. A strong acid site having a pKa of −8.2 or less of the chemically treated ion-exchangeable third layered silicate granulated particles (E)' was 25 µmol/g.

(4)' Comparative Example 2-4

Step (4-5)' Method for Producing Catalyst for Olefin Polymerization 30.9 g of dry pre-polymerized catalyst was obtained in the same manner as in the step (1-5) in Example 2-1, except that the third layered silicate granulated particles (E)' obtained in the above step (4-3)' were used. A pre-polymerization ratio (a value obtained by dividing an amount of the pre-polymerized polymer by an amount of the solid catalyst) was 2.07.

(4)" Comparative Example 3-4

Step (4-6)' Polymerization of Propylene

The same operation as in step (1-6) in the Example 3-1 was performed except that the catalyst obtained from the above step (4-5)' was used. As a result, 180.4 g of a polymer was obtained. A catalytic activity was 4510 g-PP/g-catalyst/hr. MFR was 1.60 g/10 min. The polymerization results were shown in Table 2.

(5) Comparative Example 1-5C

Step (5-1)' Ion-exchangeable First Layered Silicate (B)'

As the ion-exchangeable layered silicate (A) as a raw material, "Benclay SL" manufactured by Mizusawa Industrial Chemicals, Ltd. and containing smectite-group montmorillonite having a 2:1 type layer structure as a main component was used, but grinding was not performed. Therefore, the ion-exchangeable layered silicate (A) was directly subjected to the following step as the ion-exchangeable first layered silicate (B)'.

A chemical composition (% by weight) of raw material montmorillonite thereof was Al of 8.87, Si of 33.66, Fe of 1.99, Mg of 2.04, Na of 2.55, K of 0.66, and Ca of 0.20. An average particle diameter of the smectite dispersed in the aqueous solvent was 0.41 µm. A Rosin-Rammler distribution constant n was 3.88. A method for preparing the aqueous slurry thereof and a method for measuring the aqueous slurry were according to the methods described above.

Step (5-2)' Spray Drying Granulation of Ion-exchangeable Second Layered Silicate (B)': Step (3)'

4 L of distilled aqueous slurry having 4% by weight of ion-exchangeable second layered silicate (B)' in the above step (5-1)' was prepared and allowed to stand for one day. A viscosity of the aqueous slurry was 5.20 cp. The spray-drying granulation was performed in the same manner as in the step (1-2) in Example 1-1A, and 130 g of ion-exchangeable first layered silicate granulated particles (C)' having an average particle diameter of 13.6 µm were collected.

XRD measurement of the ion-exchangeable first layered silicate granulated particles (C)' revealed that each of peaks corresponding to the peaks (x), (y), and (z) were detected one by one in a range of 2θ of 5.0 degrees to 25.0 degrees. The results were summarized in Table 1.

A chemical composition (% by weight) of the ion-exchangeable first layered silicate granulated particles (C)' was Al of 8.87, Si of 33.66, Fe of 1.99, Mg of 2.04, Na of 2.55, K of 0.66, and Ca of 0.20. Si(s)/Si(t) was 0.671 and Mg/Al was 0.243.

Step (5-3)' Contact of Ion-exchangeable First Layered Silicate Granulated Particles (C)' with Acid: Step (4)'

Contact with acid was performed in the same manner as in step (1-3) in Example 1-1A, except that the first layered silicate (C)' obtained in the above step (5-2)' were used. A solid content in 1 g of the cake was 0.32 g. A chemical composition (% by weight) of the chemically treated ion-exchangeable second layered silicate granulated particles (D)' was Al of 5.6, Si of 40.1 (Al/Si=0.145), and Mg of 1.2, and Al eluted by the treatment was 47.0%. A washing ratio was 0.11. A specific surface area was 290 m²/g.

Step (5-4)' Chemical Treatment with Salts and/or Bases of Chemically Treated Ion-Exchangeable Second Layered Silicate Granulated Particles (D)': Step (5)'

Distilled water was added to the cake of the above chemically treated ion-exchangeable second layered silicate granulated particles (D)' so as to have a montmorillonite concentration of 16.5% by weight. A pH of the slurry at this time was 1.23. A temperature was raised to 40° C., and a lithium hydroxide aqueous solution adjusted to a concentration of 1.5 mol/L was added dropwise thereto until the pH of the slurry reached 6.50. An amount of the lithium hydroxide aqueous solution added dropwise was 199.5 g. The mixture was allowed to react for 90 minutes while maintaining the temperature at 40° C. The pH of the slurry at the end of the reaction was 5.78. The reaction slurry was filtered by a device in which an aspirator was connected to a Nutsche and a suction bottle, and washed four times with 750 g of distilled water. The collected cake was dried at 110° C. overnight. Further, before using as a catalyst component, drying under reduced pressure at 200° C. was performed for 5 hours to obtain 67 g of ion-exchangeable chemically treated third layered silicate granulated particles (E)'. A strong acid site having a pKa of −8.2 or less of the chemically treated ion-exchangeable third layered silicate granulated particles (E) was 17 µmol/g.

(5)' Comparative Example 2-5

Step (5-5)' Method for Producing Catalyst for Olefin Polymerization 32.0 g of dry pre-polymerized catalyst was obtained in the same manner as in the step (1-5) in Example 2-1, except that the third layered silicate granulated particles (E)' obtained in the above step (5-4)' were used. A pre-polymerization ratio (a value obtained by dividing an amount of the pre-polymerized polymer by an amount of the solid catalyst) was 2.14.

(5)" Comparative Example 3-5

Step (5-6)' Polymerization of Propylene

The same operation as in the step (1-6) in Example 3-1 was performed except that the dry pre-polymerized catalyst obtained from the above step (5-5)' was used. As a result, 163.8 g of a polymer was obtained. A catalytic activity was 4095 g-PP/g-catalyst/hr. MFR was 2.02 g/10 min. The polymerization results were shown in Table 2.

(6) Comparative Example 2-6 Step (6-5)' Method for Producing Catalyst for Olefin Polymerization A catalyst preparation and a pre-polymerization operation were performed in the same manner as in the step (6-5) in Example 2-6 except that the ion-exchangeable third layered silicate granulated particles (E)' obtained from Comparative Example 1-1C were used, and 32.8 g of a dry pre-polymerized catalyst was obtained. A pre-polymerization ratio (a value obtained by dividing an amount of the pre-polymerized polymer by an amount of the solid catalyst) was 2.18.

(6)" Comparative Example 3-6

Step (6-6)' Polymerization of Propylene

Polymerization was performed in the same manner as in the step (6-6) in Example 3-6, except that the dry pre-polymerized catalyst obtained from the above step (6-5)' was used. As a result, 233.8 g of a polymer was obtained. A catalytic activity was 23380 g-PP/g-catalyst/hr. MFR was 49.3 g/10 min. The polymerization results were shown in Table 3.

TABLE 1

| | Second Layered Silicate (B), (B') | | | | First layered silicate granulated particles (C), (C') | | | | | | | | | | Second layered silicate granulated particles (D), (D') | Second layered silicate granulated particles (D), (D') or third layered silicate granulated particles (E), (E') Acid amount (pKa ≤ -8.2) (μmol/g) |
|---|---|---|---|---|---|---|---|---|---|---|---|---|---|---|---|---|
| | Grinding method | Grinding time (minutes) | Characteristic (b1) Average particle diameter (μm) | Characteristic (b2) Rosin-Rammler distribution constant n | Peak (X) position 2θ (degree) | Peak (Y) position 2θ (degree) | Peak (Z) position 2θ (degree) | Peak (X) peak intensity | Peak (Y) peak intensity | Peak (Z) peak intensity | Characteristic (c1) Peak intensity ratio (Y/X) | Characteristic (c2) Peak intensity ratio (Z/X) | Characteristic (c3) Si(s)/Si(t) (mol/mol) | Characteristic (c4) Mg/Al (mol/mol) | Specific surface area (m²/g) | |
| Example 1-1A | Wet bead mill | 30 | 0.16 | 3.53 | 19.69 | 9.05 | No peak | 450 | 140 | — | 0.31 | — | 0.911 | 0.335 | 429 | 50 |
| Example 1-2A | Wet bead mill | 165 | 0.12 | 5.49 | 19.67 | 9.03 | No peak | 388 | 115 | — | 0.30 | — | 0.909 | 0.337 | 417 | 47 |
| Example 1-3A | Wet bead mill | 15 | 0.17 | 3.30 | 19.65 | 9.12 | No peak | 411 | 122 | — | 0.30 | — | 0.911 | 0.335 | 399 | 46 |
| Example 1-4A | Wet bead mill | 90 | 0.29 | 2.41 | 19.66 | 8.99 | No peak | 386 | 107 | — | 0.28 | — | 0.911 | 0.336 | 374 | 34 |
| Example 1-5A | No | 0 | 0.18 | 4.29 | 19.78 | 8.87 | No peak | 558 | 178 | — | 0.32 | — | 0.998 | 0.537 | 534 | 45 |
| Comparative Example 1-1C | No | 0 | 0.54 | 1.46 | 19.70 | 9.13 | 22.06 | 438 | 127 | 129 | 0.29 | 0.29 | 0.907 | 0.302 | 330 | 29 |
| Comparative Example 1-2C | No | 0 | 0.47 | 3.55 | 19.71 | 8.94 | 21.73 | 639 | 163 | 263 | 0.26 | 0.41 | 0.942 | 0.304 | 340 | 29 |
| Comparative Example 1-3C | Wet bead mill | 1300 | 0.04 | 1.10 | No peak | No peak | No peak | — | — | — | — | — | 0.901 | 0.331 | 240 | 20 |
| Comparative Example 1-4C | Wet bead mill | 600 | 0.14 | 1.40 | 19.80 | 8.81 | No peak | 378 | 97 | — | 0.26 | — | 0.902 | 0.331 | 325 | 25 |
| Comparative Example 1-5C | No | 0 | 0.41 | 3.88 | 19.78 | 5.92 | 21.72 | 395 | 288 | 298 | 0.73 | 0.75 | 0.671 | 0.255 | 290 | 17 |

TABLE 2

| | Catalyst for olefin polymerization | | | Olefin polymer | | |
|---|---|---|---|---|---|---|
| | Third layered silicate granulated particles (E), (E)' | Complex type | | Yield (g) | Activity (g-PP/g-catalyst/h) | MFR (g/10 minutes) |
| Example 2-1 | Example 1-1A | I, II | Example 3-1 | 253.1 | 6328 | 0.85 |
| Example 2-2 | Example 1-2A | I, II | Example 3-2 | 248.0 | 6200 | 0.75 |
| Example 2-3 | Example 1-3A | I, II | Example 3-3 | 240.8 | 6020 | 0.92 |
| Example 2-4 | Example 1-4A | I, II | Example 3-4 | 221.0 | 5525 | 1.15 |
| Example 2-5 | Example 1-5A | I, II | Example 3-5 | 225.0 | 5625 | 1.05 |
| Comparative Example 2-1 | Comparative Example 1-1C | I, II | Comparative Example 3-1 | 180.8 | 4520 | 1.50 |
| Comparative Example 2-2 | Comparative Example 1-2C | I, II | Comparative Example 3-2 | 182.6 | 4565 | 1.55 |
| Comparative Example 2-3 | Comparative Example 1-3C | I, II | Comparative Example 3-3 | 168.6 | 4215 | 2.08 |
| Comparative Example 2-4 | Comparative Example 1-4C | I, II | Comparative Example 3-4 | 180.4 | 4510 | 1.60 |
| Comparative Example 2-5 | Comparative Example 1-5C | I, II | Comparative Example 3-5 | 163.8 | 4095 | 2.02 |

TABLE 3

| | Catalyst for olefin polymerization | | | Olefin polymer | | |
|---|---|---|---|---|---|---|
| | Third layered silicate granulated particles (E), (E)' | Complex type | | Yield (g) | Activity (g-PP/g-catalyst/h) | MFR (g/10 minutes) |
| Example 2-6 | Example 1-1A | III | Example 3-6 | 380.0 | 38000 | 12.5 |
| Example 2-7 | Example 1-3A | III | Example 3-7 | 422.7 | 42270 | 21.2 |
| Example 2-8 | Example 1-5A | III | Example 3-8 | 403.1 | 40310 | 16.9 |
| Comparative Example 2-6 | Comparative Example 1-1C | III | Comparative Example 3-6 | 233.8 | 23380 | 49.3 |

5. CONSIDERATION BY COMPARISON BETWEEN EXAMPLES AND COMPARATIVE EXAMPLES

Figure 2:
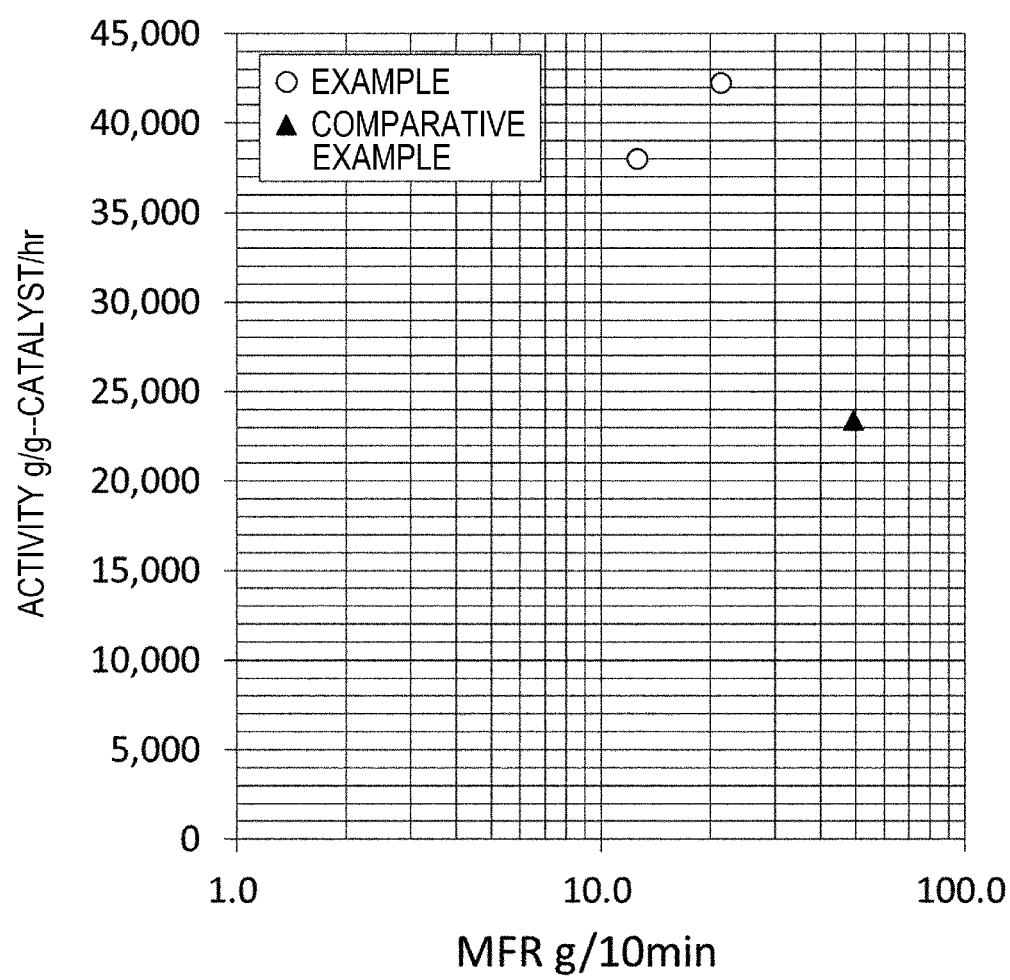
FIG. 2 is a graph showing a relationship between MFR and the catalytic activity.
Figure 3:
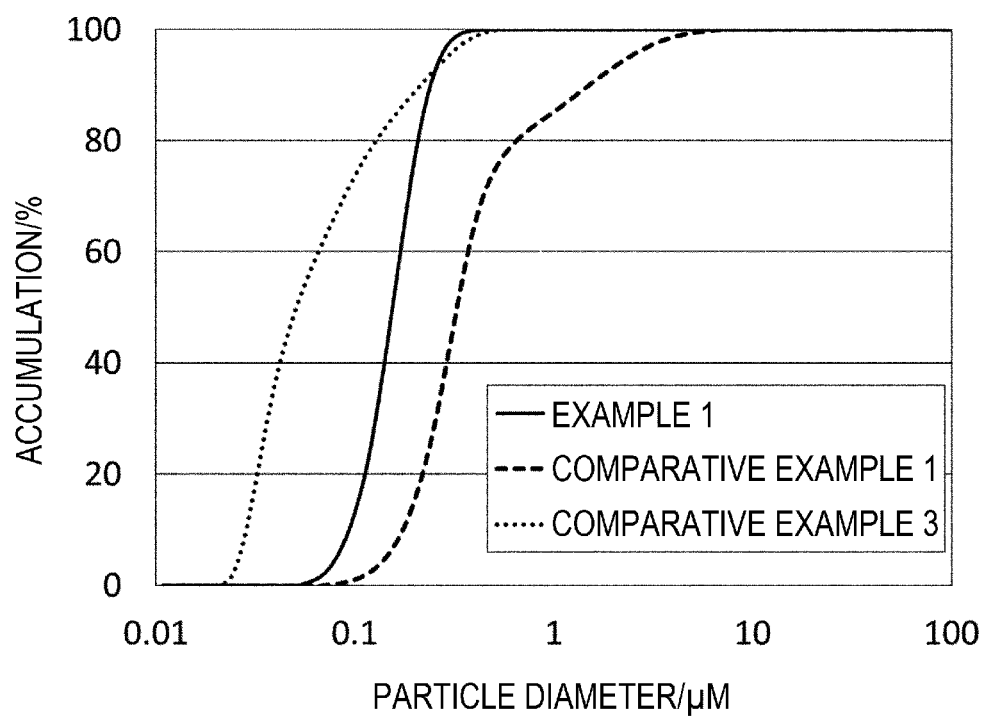
FIG. 3 is a diagram showing a particle size distribution of a second layered silicate (B) in Examples and Comparative Examples.

Since a polymerization activity depends on a molecular weight of the polymer, it is necessary to evaluate MFR, which is an index of the molecular weight, when comparing superiority and inferiority of the polymerization activity. FIGS. 1 and 2 are a diagram in which the polymerization activity per solid component is plotted with respect to MFR of the obtained polymer in Examples and Comparative Examples. With reference to FIGS. 1 and 2, it is clear that in Examples using the catalyst component obtained by the production method according to the present embodiment, the polymerization activity with respect to MFR is at a higher level than in Comparative Examples, and the polymerization activity in the Examples is excellent. It is clear that, in Examples using the catalyst component according to the present embodiment, a polymer having a lower MFR at the same hydrogen amount, that is, a polymer having a higher molecular weight can be produced with high activity, and the index of the polymer can be expanded, as compared with Comparative Examples.

Although the present invention has been described in detail with reference to the specific embodiments, it is obvious to those skilled in the art that various changes and modifications may be made without departing from the gist and the scope of the present invention. The present application is based on a Japanese Patent Application (Japanese Patent Application No. 2019-067540) filed on Mar. 29, 2019, contents of which are incorporated herein by reference.

INDUSTRIAL APPLICABILITY

According to the method for producing a catalyst component for olefin polymerization of the present invention, a catalyst component for olefin polymerization that has an increased active site and can produce an olefin polymer with high activity can be produced. According to the catalyst for olefin polymerization using the catalyst component for olefin polymerization, the polymerization activity is improved, and a polymer having a higher molecular weight can be obtained, and thus the industrial applicability is high.

The invention claimed is:

1. A method for producing a catalyst component for olefin polymerization, comprising the following step (3) and the following step (4):
   step (3): granulating, by a spray drying, an aqueous slurry of an ion-exchangeable second layered silicate (B) that satisfies the following characteristic (b1) and characteristic (b2) to obtain ion-exchangeable first layered silicate granulated particles (C),
   characteristic (b1): an average particle diameter is 0.03 μm to 0.4 μm,
   characteristic (b2): a Rosin-Rammler distribution constant n as determined from a particle size distribution is 1.5 or more, and
   step (4): bringing the obtained first layered silicate granulated particles (C) into contact with acid to obtain chemically treated ion-exchangeable second layered silicate granulated particles (D).

2. The method for producing a catalyst component for olefin polymerization according to claim 1, wherein the second layered silicate (B) contains smectite.

3. The method for producing a catalyst component for olefin polymerization according to claim 1, wherein the second layered silicate (B) contains montmorillonite.

4. The method for producing a catalyst component for olefin polymerization according to claim 1, wherein the second layered silicate granulated particles (D) have a specific surface area of 350 m$^2$/g or more.

5. The method for producing a catalyst component for olefin polymerization according to claim 1, further comprising the following step (5):
   step (5): bringing the obtained second layered silicate granulated particles (D) into contact with at least one of a base and a salt to obtain chemically treated ion-exchangeable third layered silicate granulated particles (E).

6. The method for producing a catalyst component for olefin polymerization according to claim 1, further comprising the following step (2) before the step (3):
   step (2): grinding an ion-exchangeable first layered silicate (A) with a grinder to obtain the second layered silicate (B).

7. The method for producing a catalyst component for olefin polymerization according to claim 1, further comprising the following step (1) before the step (3):
   step (1): grinding an aqueous slurry of an ion-exchangeable first layered silicate (A) by a wet bead mill to obtain an aqueous slurry of the second layered silicate (B).

8. The method for producing a catalyst component for olefin polymerization according to claim 1, wherein the first layered silicate granulated particles (C) satisfy the following characteristic (c1):

characteristic (c1): in X-ray diffraction (XRD), a peak (x) is present in a first range of 2θ of 19.0 degrees to 20.0 degrees and a peak (y) is present in a second range of 2θ of 5.0 degrees to 10.0 degrees, and a relationship of 0.27≤(Y/X) is satisfied, where X is a maximum peak intensity in the first range and Y is a maximum peak intensity in the second range.

9. A method for producing a catalyst for olefin polymerization, comprising: bringing the following component (I) and component (II) into contact with each other:
   component (I): a catalyst component for olefin polymerization obtained by the production method according to claim 1, and
   component (II): a metallocene compound.

10. The method for producing a catalyst for olefin polymerization according to claim 9, further comprising: bringing the following component (III) into contact with the component (I) and the component (II):
    component (III): an organoaluminum compound.

11. The method for producing a catalyst for olefin polymerization according to claim 9, further comprising: bringing an α-olefin having 2 to 20 carbon atoms into contact with the component (I) and the component (II).

12. A method for producing an olefin (co)polymer, comprising: homopolymerizing or copolymerizing an α-olefin having 2 to 20 carbon atoms in a presence of a catalyst for olefin polymerization obtained by the production method according to claim 9.

* * * * *